US009742886B2

(12) United States Patent
Hansen, Sr. et al.

(10) Patent No.: US 9,742,886 B2
(45) Date of Patent: Aug. 22, 2017

(54) SHROUD ASSEMBLY FOR COMMUNICATION SITE

(71) Applicant: Communication Structures and Solutions Inc., Sumner, WA (US)

(72) Inventors: Skyle D. Hansen, Sr., Sumner, WA (US); Skyle D. Hansen, Jr., Graham, WA (US)

(73) Assignee: Communication Structures and Solutions Inc., Lakewood, WA (US)

( * ) Notice: Subject to any disclaimer, the term of this patent is extended or adjusted under 35 U.S.C. 154(b) by 0 days.

(21) Appl. No.: 14/454,578

(22) Filed: Aug. 7, 2014

(65) Prior Publication Data

US 2015/0045093 A1   Feb. 12, 2015

Related U.S. Application Data

(60) Provisional application No. 61/863,363, filed on Aug. 7, 2013.

(51) Int. Cl.
| | |
|---|---|
| *H04M 1/02* | (2006.01) |
| *H04B 1/03* | (2006.01) |
| *H01Q 1/42* | (2006.01) |
| *H01Q 1/12* | (2006.01) |
| *H01Q 1/24* | (2006.01) |

(Continued)

(52) U.S. Cl.
CPC ........ *H04M 1/0283* (2013.01); *H01Q 1/1242* (2013.01); *H01Q 1/246* (2013.01); *H01Q 1/42* (2013.01); *H01Q 1/44* (2013.01); *H04B 1/03* (2013.01); *H04W 88/08* (2013.01)

(58) Field of Classification Search
CPC . H01Q 5/47; H01Q 1/44; H01Q 21/08; H04B 1/03; H04M 1/0283; H04M 1/02
See application file for complete search history.

(56) References Cited

U.S. PATENT DOCUMENTS 4,785,579 A * 11/1988 Sugiyama ............. E05B 65/102
49/118
5,390,581 A *  2/1995 Hiltz et al. .................. 89/1.812
(Continued)

FOREIGN PATENT DOCUMENTS

JP    2005331377 A    12/2005
WO    2012/002603 A1    1/2012

OTHER PUBLICATIONS

International Search Report and Written Opinion mailed Nov. 24, 2014, issued in corresponding International Application No. PCT/US2014/050225, filed Aug. 7, 2014, 9 pages.
(Continued)

*Primary Examiner* — Bobbak Safaipour
(74) *Attorney, Agent, or Firm* — Christensen O'Connor Johnson Kindness PLLC

(57) ABSTRACT

Generally described, aspects of the disclosed subject matter are directed to a shroud assembly for a communication site. In accordance with one embodiment of the present disclosure, a shroud assembly for a communication site is provided. The shroud assembly generally includes a wall portion, and a door portion movably coupled to the wall portion, wherein the door portion is configured for selective positioning in at least first and second positions relative to the wall portion, and wherein the wall portion and the door portion define a cover assembly having an inner chamber.

22 Claims, 26 Drawing Sheets

(51) Int. Cl.
*H01Q 1/44* (2006.01)
*H04W 88/08* (2009.01)

(56) References Cited

U.S. PATENT DOCUMENTS

| | | | | |
|---|---|---|---|---|
| 5,515,061 | A * | 5/1996 | Hiltz et al. | 342/385 |
| 5,793,334 | A * | 8/1998 | Anderson | H01Q 13/02 333/126 |
| 5,953,970 | A * | 9/1999 | Haller | B23G 1/08 82/118 |
| 5,999,143 | A * | 12/1999 | Glynn | H01Q 1/42 343/840 |
| 6,166,707 | A * | 12/2000 | Painter | H01Q 1/12 343/702 |
| 2002/0133293 | A1* | 9/2002 | Goldman | 701/213 |
| 2005/0007295 | A1 | 1/2005 | Janoschka et al. | |
| 2009/0141179 | A1* | 6/2009 | Jung et al. | 348/723 |
| 2009/0224554 | A1 | 9/2009 | Flynn | |
| 2010/0171678 | A1* | 7/2010 | Mao | 343/841 |
| 2012/0098710 | A1 | 4/2012 | Seal | |
| 2012/0214335 | A1 | 8/2012 | Natoli | |
| 2012/0256810 | A1 | 10/2012 | Caldwell | |

OTHER PUBLICATIONS

International Preliminary Report on Patentability mailed Feb. 9, 2016, issued in corresponding International Application No. PCT/US2014/050225, filed Aug. 7, 2014, 7 pages.
Extended European Search Report mailed Feb. 24, 2017, issued in corresponding European Application No. 14833648.0, filed Aug. 7, 2014, 8 pages.

* cited by examiner

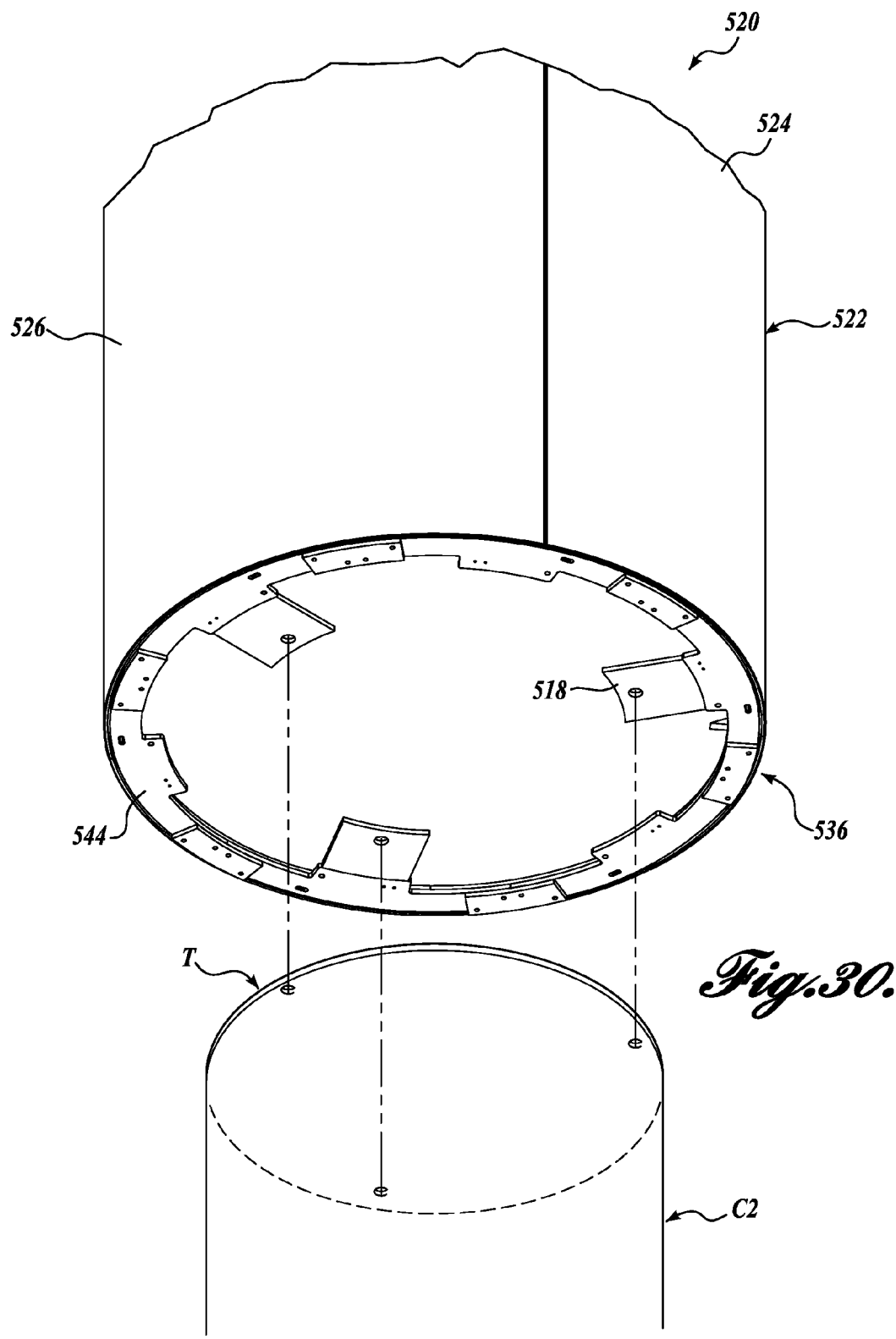

SHROUD ASSEMBLY FOR COMMUNICATION SITE

CROSS-REFERENCE TO RELATED APPLICATION

This application claims the benefit of U.S. Provisional Application No. 61/863,363, filed Aug. 7, 2013, the disclosure of which is hereby expressly incorporated by reference herein in its entirety.

BACKGROUND

With increasing cellular telephonic communications, an increasing number of communication sites (also called "cell sites" or "cell towers") are employed to improve the cellular signals in a cellular network and handle the volume of devices connected to the network. A communication site is a cellular telephone site in which antennas and electronic communications equipment are placed. The site is typically on an elevated structure, such as a radio mast, tower, or at a high place, to create a cell in a cellular network. The elevated structure may support antennas, one or more sets of transmitter/receiver transceivers, digital signal processors, control electronics, a GPS receiver for timing, primary and backup electrical power sources, and sheltering. The increasing number of cell sites improves overlap for "handover" to or from other cell sites. A handover occurs when a device's signal transfers from one cell site to another, while in use, to either select the strongest immediate signal, or while the device is in motion, such as in a train or car.

Although sometimes called "cell towers," the site's antennas and electronic communications equipment may be mounted on a building rather than a discrete tower. Cell sites are also commonly called base transceiver stations (BTS), mobile phone masts, or base stations sites. Oftentimes, the cell site will be a co-location for multiple mobile operators, and therefore will include multiple base stations at a single site.

Some cities and municipalities require that cell sites, for safety and aesthetic reasons, be covered or be inconspicuous to the general public. Therefore, the mast, antennas, and electronic communications equipment of the cell site are typically disguised as something else, for example, a flag pole, street lamp, or a tree (e.g., a palm tree), or as rooftop structures or urban features, such as chimneys or panels designed to blend with their surroundings. These installations are generally referred to as concealed cell sites or stealth cell sites. Most commonly, cell sites are covered with a shroud to disguise the electronic communications equipment.

The shrouds are typically manufactured from materials that will not interfere with the radio signals transmitting to and from the cell sites. These materials are commonly referred to as "radio-frequency (RF) transparent." The maximum range of the cell site, affecting the desired density of cell sites in a given area, depends on many circumstances, including the design and materials of the shrouds covering the antennas. Device signals do not require a clear line of sight to an antenna, but a higher amount of radio interference will degrade or eliminate reception. A shroud designed with materials that are more RF transparent will increase the effectiveness of the cell site.

In addition, the shrouds are typically configured to provide access to the cell sites on a regular basis for servicing and general maintenance of the antennas and electronic communications equipment contained within the shroud. In that regard, shrouds are typically designed as a non-metallic panel system that is constructed using non-metallic fasteners, such as screws. Because of the many fasteners involved in these shrouds, maintenance can be time consuming, and oftentimes dangerous work at high heights. For example, removing the panels in heavy winds or rain can be treacherous for the technician and a hazard for bystanders on the ground below.

Therefore, there exists a need for improved communication site shroud design to provide enhanced accessibility to the internal components of the site and increased safety for the technicians. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a shroud assembly for a communication site is provided. The shroud assembly generally includes a wall portion, and a door portion movably coupled to the wall portion, wherein the door portion is configured for selective positioning in at least first and second positions relative to the wall portion, and wherein the wall portion and the door portion define a cover assembly having an inner chamber.

In accordance with another embodiment of the present disclosure, a shroud assembly for a communication site is provided. The shroud assembly generally includes a wall portion, and a door portion movably coupled to the wall portion, wherein the door portion is configured for selective positioning in at least first and second positions relative to the wall portion, and wherein the wall portion and the door portion define a cover assembly having an inner chamber. The shroud assembly further includes a track system operably coupled to the door portion for sliding movement of the door portion relative to the wall portion.

In accordance with any of the embodiments described herein, the cover assembly may be configured for surrounding at least a portion of the communication site.

In accordance with any of the embodiments described herein, the cover assembly may be radio-frequency transparent.

In accordance with any of the embodiments described herein, the cover assembly may be made from non-metallic materials.

In accordance with any of the embodiments described herein, the door portion may be in a closed position when in the first position.

In accordance with any of the embodiments described herein, the door portion may be in an opened position when in the second position.

In accordance with any of the embodiments described herein, the cover assembly may be fixed in position relative to the communication site.

In accordance with any of the embodiments described herein, the shroud assembly may have a substantially circular cross-section when the door portion is in the first position.

In accordance with any of the embodiments described herein, the shroud assembly may include a rotation assembly for allowing circumferential rotation of the cover assembly relative to the communication site.

In accordance with any of the embodiments described herein, the shroud assembly may include a stopping device for selectively stopping circumferential rotation.

In accordance with any of the embodiments described herein, the door portion may be hingedly coupled to the wall portion with a hinge assembly.

In accordance with any of the embodiments described herein, one or more hinges in the hinge assembly may be radio-frequency transparent.

In accordance with any of the embodiments described herein, one or more hinges in the hinge assembly may be made from non-metallic materials.

In accordance with any of the embodiments described herein, one or more hinges in the hinge assembly may be made from a material including fiberglass, fibers, plastics, resins, structural foams, or combinations thereof.

In accordance with any of the embodiments described herein, the one or more hinges in the hinge assembly may be made by laying up multiple sheets of material.

In accordance with any of the embodiments described herein, the door portion may include at least first and second door panels.

In accordance with any of the embodiments described herein, the first and second door panels may be hingedly coupled to one another.

In accordance with any of the embodiments described herein, the shroud assembly may include a track system operably coupled to the door portion.

In accordance with any of the embodiments described herein, the track system may include at least a first track.

In accordance with any of the embodiments described herein, the track system may include at least a second track.

In accordance with any of the embodiments described herein, the track system may be designed to maintain the door portion in an opened position when the door portion is subjected to wind pressure.

In accordance with any of the embodiments described herein, the shroud assembly may further include a mounting assembly for mounting the shroud assembly to the communication site.

In accordance with any of the embodiments described herein, the shroud assembly may have a substantially rectangular cross-section when the door portion is in the first position.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 30 is an isometric view of a shroud assembly for a communication site formed in accordance with another embodiment of the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Embodiments of the present disclosure are generally directed to shroud assemblies for cell sites. In general, examples of the shroud assemblies are movably openable and closeable to allow for improved access to internal components. The embodiments illustrated in the FIGURES have been designed for use with cell sites for cellular communication. However, the assemblies of the present disclosure may also be used in other types of shrouding applications.

Referring to FIGS. 1-4, a shroud assembly 20 designed in accordance with one embodiment of the present disclosure is provided. The shroud assembly 20 includes a cover assembly 22. In the illustrated embodiment, the cover assembly 22 includes a wall portion 26 and a door portion 24 movably coupled to the wall portion 26.

Figure 2:
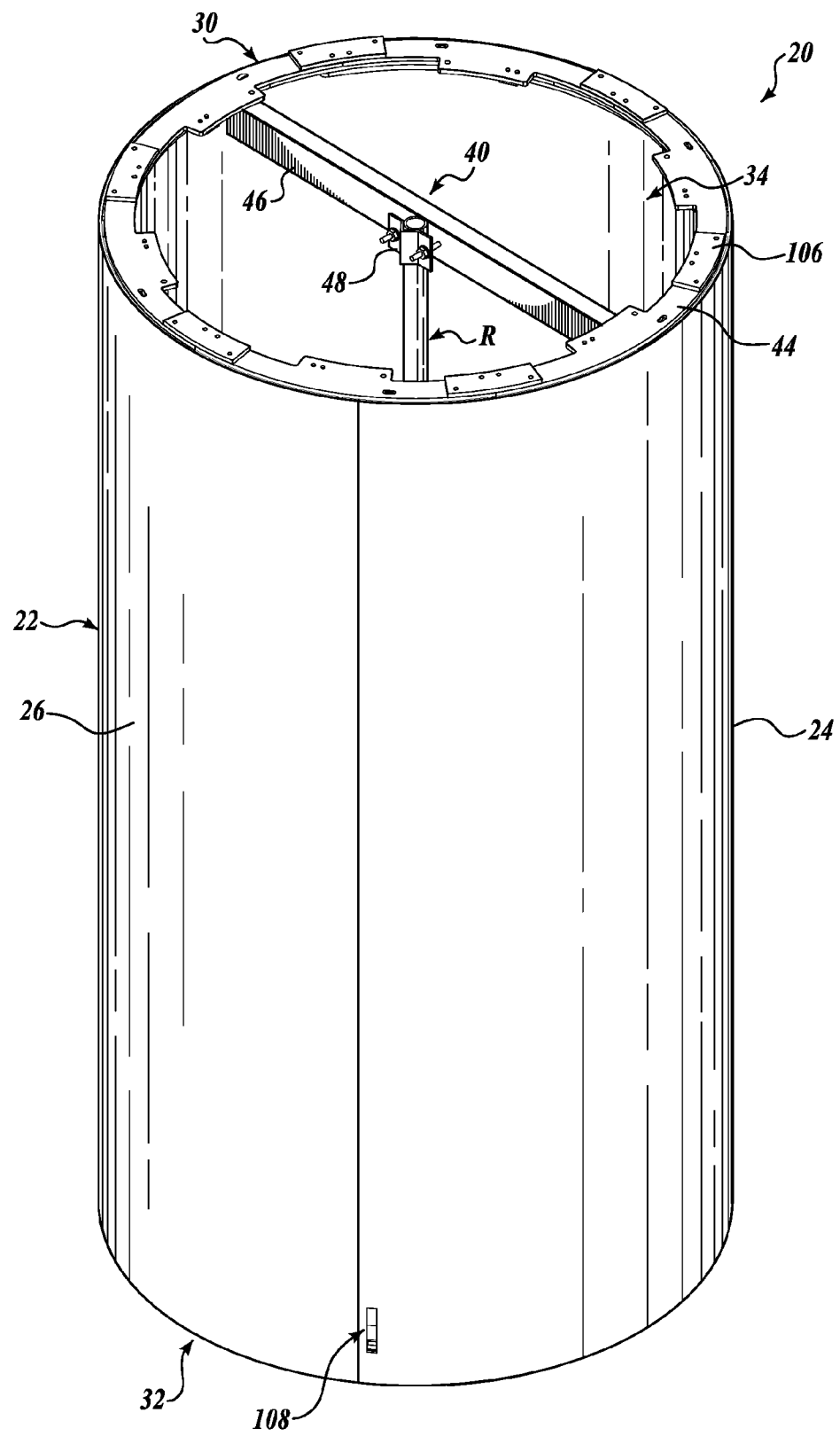
FIG. 2 is an isometric view of the shroud assembly of FIG. 1 with the door in a closed position.

Referring to FIG. 2, the shroud assembly 20 has first (top) end 30 and a second (bottom) end 32. The cover assembly 22 defines an inner chamber 34 to protect at least a portion of the communication site C contained within the shroud assembly 20 between the first and second ends 30 and 32. Comparing FIG. 3 with FIG. 2, the door portion 24 is openable to allow access to the inner chamber 34 for access to the communication site C (electronic communications equipment not shown in the inner chamber 34).

Figure 1:
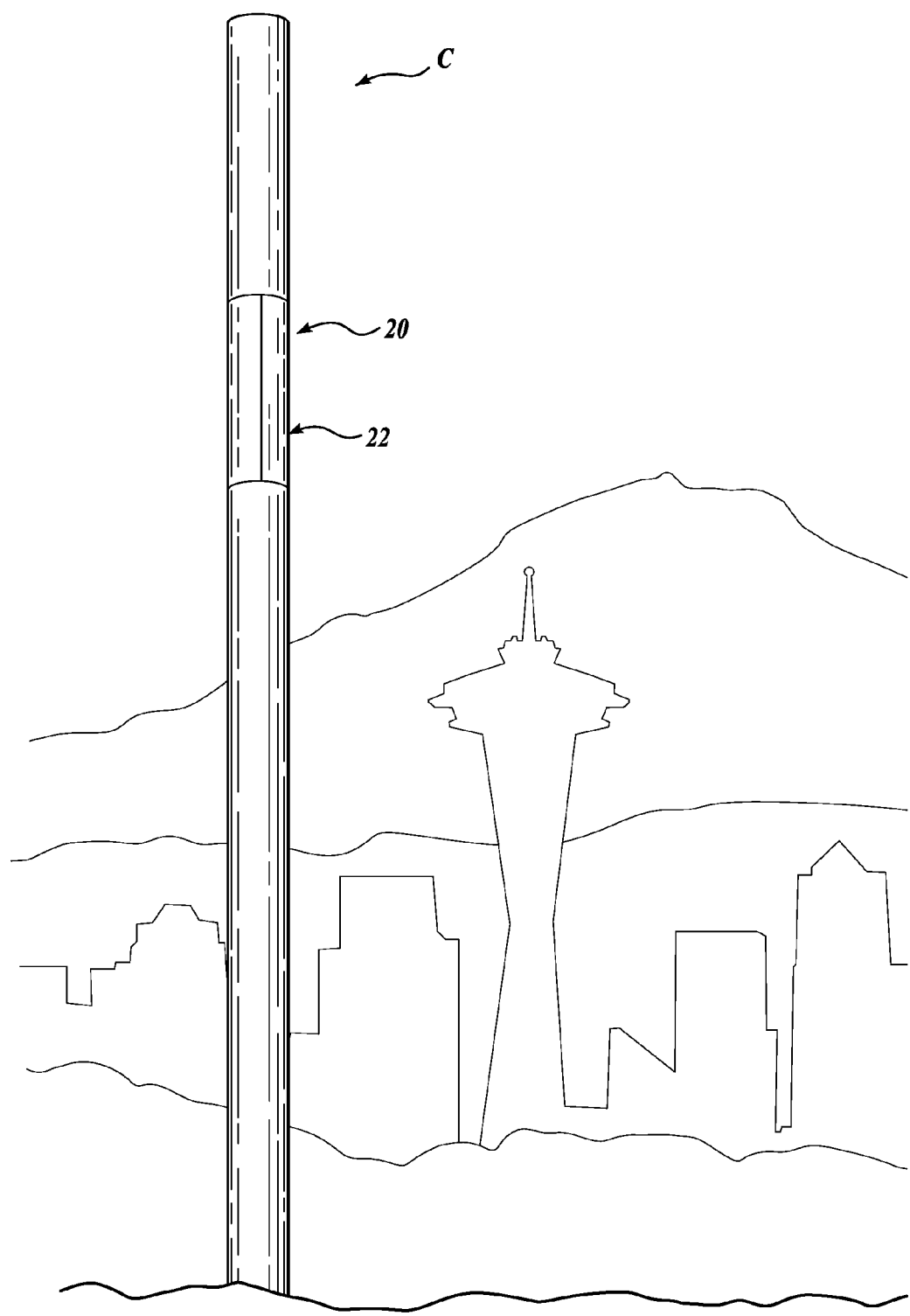
FIG. 1 is a perspective view of a shroud assembly formed in accordance with one embodiment of the present disclosure, showing the shroud assembly coupled to a communication site.

Orientation language, such as "top", "bottom", "upper", "lower", and "underside", are used in the specification with reference to the orientation of the shroud assembly 20 on a communication site C, as shown in FIG. 1. This language is intended to help the reader and is not intended to be limiting.

In the illustrated embodiment, the shroud assembly 20 has a substantially circular cross-section (see, e.g., FIG. 12), and thereby is substantially tubular is shape. Therefore, the cover assembly 22 may make up at least a portion of the length of a tube for surrounding the communication site C. Other cross-sectional shapes for the shroud assembly 20 are also within the scope of the present disclosure. For example, the cross-sectional shape of the shroud assembly 20 may be square (see, e.g., alternate embodiments in FIGS. 21-29) or another polygonal shape.

To enable radio frequency communication, the cover assembly 22 may be substantially radio frequency ("RF") transparent. In that regard, the cover assembly 22 may be made from non-metallic materials, such as fibers, plastics, resins, structural foams, or combinations of these materials, such as a composite. As non-limiting examples, a suitable fiber material may be fiberglass, a suitable plastic material may be polypropylene, a suitable resin material may be acrylonitrile butadiene styrene (ABS), and a suitable structural foam may be polyvinyl chloride (PVC). The non-metallic materials may be formed by molding, vacuum-forming, or sheet lay-up techniques.

As seen in the illustrated embodiment, the wall portion 26 of the cover assembly 22 includes at least one shroud panel. In the illustrated embodiment, the wall portion 26 is a panel having a cross-sectional shape that defines a portion of a circle. In other embodiments, the wall portion 26 may be constructed from one or more discrete shroud panels. As non-limiting examples, these shroud panels may be coupled to one another or coupled to a frame to define the wall portion 26 of the cover assembly 22.

The door portion 24 may also be constructed from one or more shroud panels. As seen in the illustrated embodiment of FIGS. 3 and 4, the door portion 24 is a door assembly constructed from two panels 74 and 76. Like the cover assembly 22, the door portion 24 may also be substantially RF transparent and may be manufactured from non-metallic materials, as described above.

In the illustrated embodiment, the door portion 24 is a door assembly defining a folding door. In that regard, the door assembly may include a hinged coupling 72 between the first and second panels 74 and 76. A hinged configuration allows the door assembly to fold on itself as the door assembly opens, and to extend as a portion of the cover assembly when the door assembly closes (see FIGS. 12 and 13). Suitable hinges in accordance with embodiments of the present disclosure are described in greater detail below.

In addition to the door portion 24 being foldable, the door portion 24 of the illustrated embodiment is configured for selective positioning in at least first and second positions relative to the wall portion 26. In comparing FIGS. 2 and 3, the door portion 24 is shown to be positioned in at least first and second positions, shown as respective closed (FIG. 2) and opened (FIG. 3) positions relative to a fixed wall portion 26. The door portion 24, however, is positionable in any number of positions relative to the wall portion 26.

Figure 14:
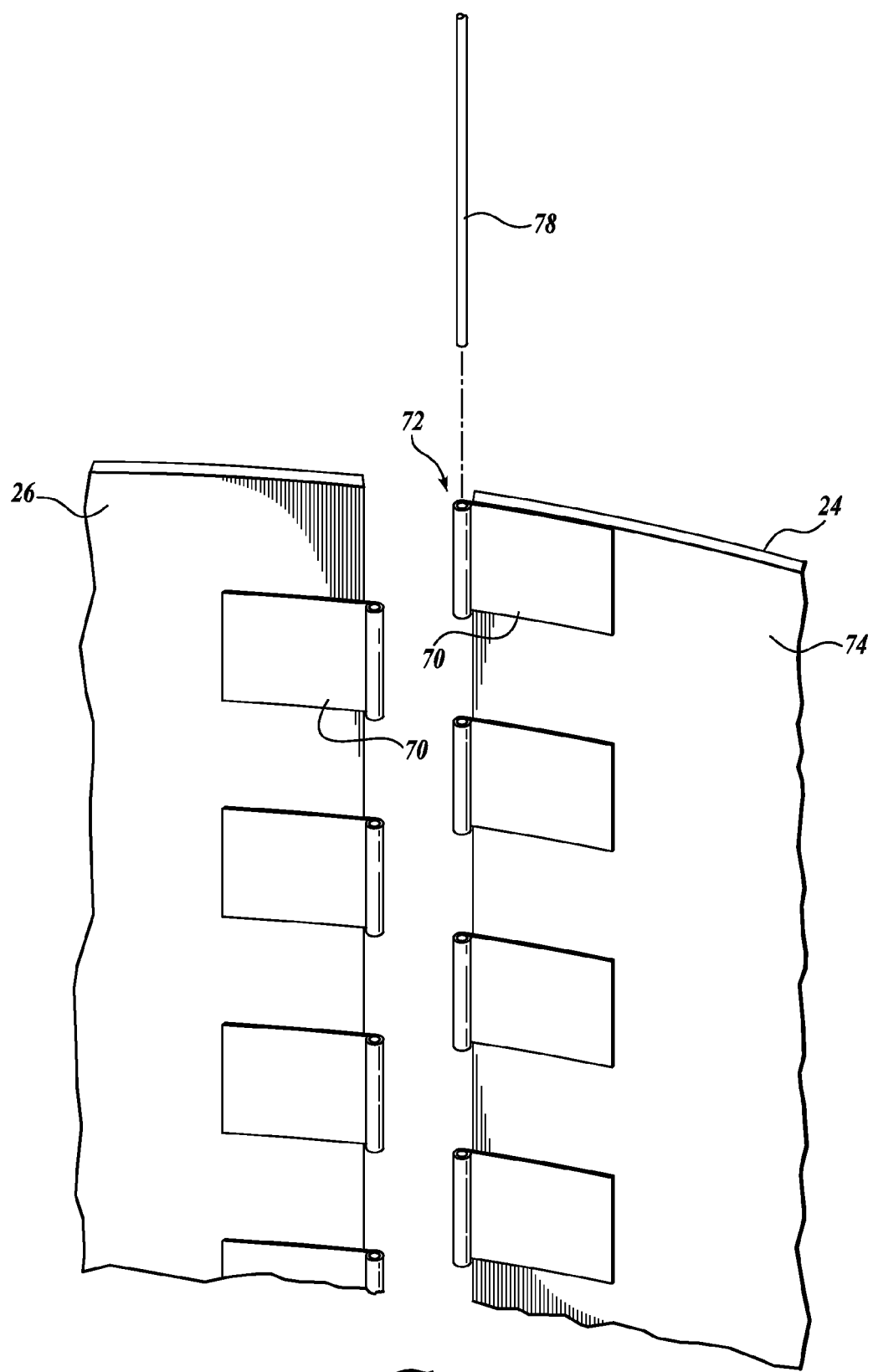
FIG. 14 is a perspective view of the inner chamber of the shroud assembly of FIG. 1 showing a hinge assembly.

The door portion 24 in the illustrated embodiment is hingedly coupled to the wall portion 26 by hinges 70 (see also FIG. 14 for an exemplary hinge design). In accordance with other embodiments of the present disclosure, other movable door configurations besides a hinged configuration are also within the scope of the present disclosure. For example, the door portion may have a slidable configuration relative to the wall portion 26, wherein the door portion would be configured to slide relative to the wall portion, on either on inside or an outside surface of the wall portion. In such a slidable configuration, a track system may be optionally included to enable the sliding relationship.

As described in greater detail below, the door portion 24 of the illustrated embodiment is movable along a track system 28 for controlled opening and closing movement (see, e.g., FIGS. 10-13). However, a track is not required to enable the door portion 24 being movably coupled to the wall portion 26.

Figure 3:
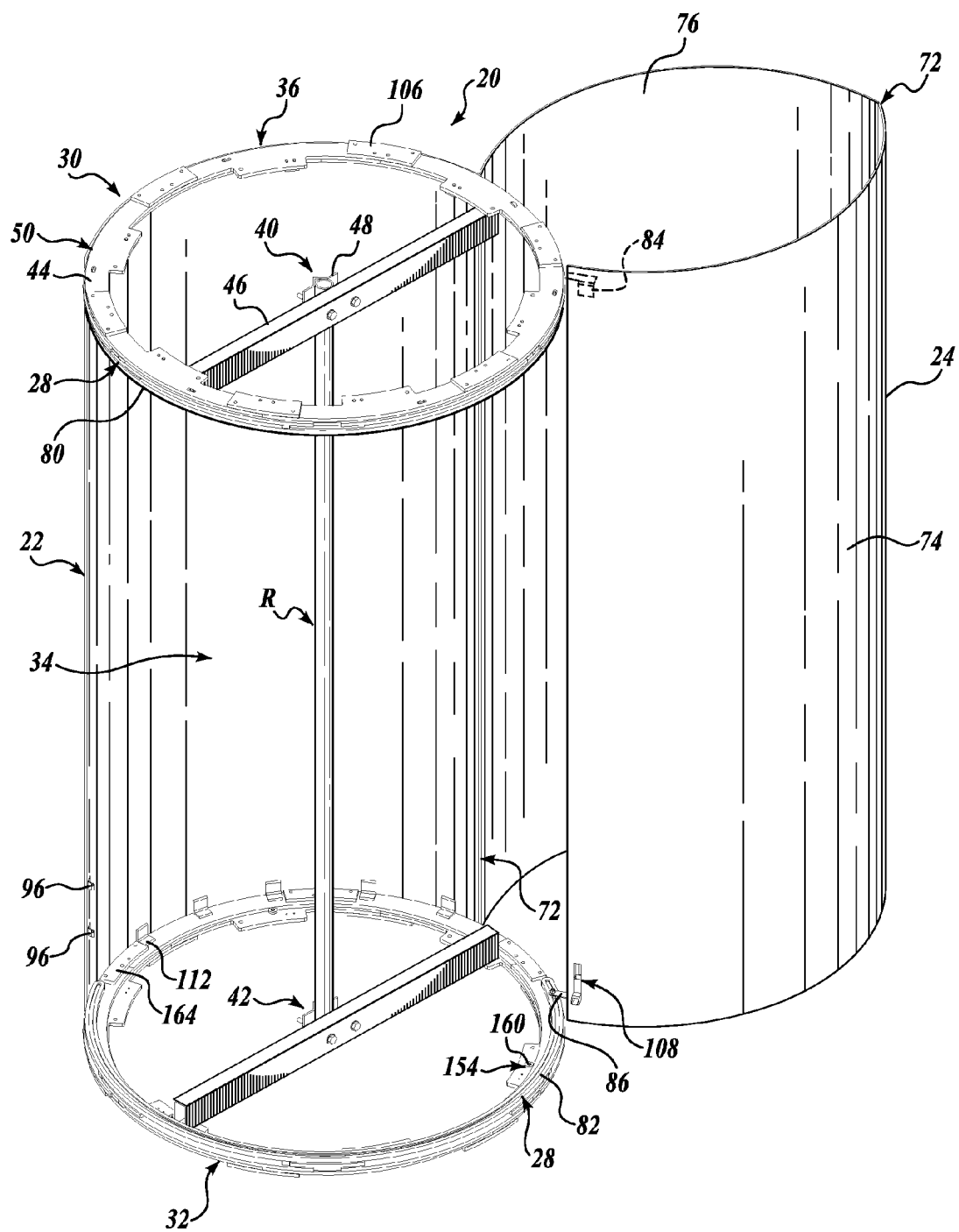
FIG. 3 is an isometric view of the shroud assembly of FIG. 1 with the door in an opened position.
Figure 4:
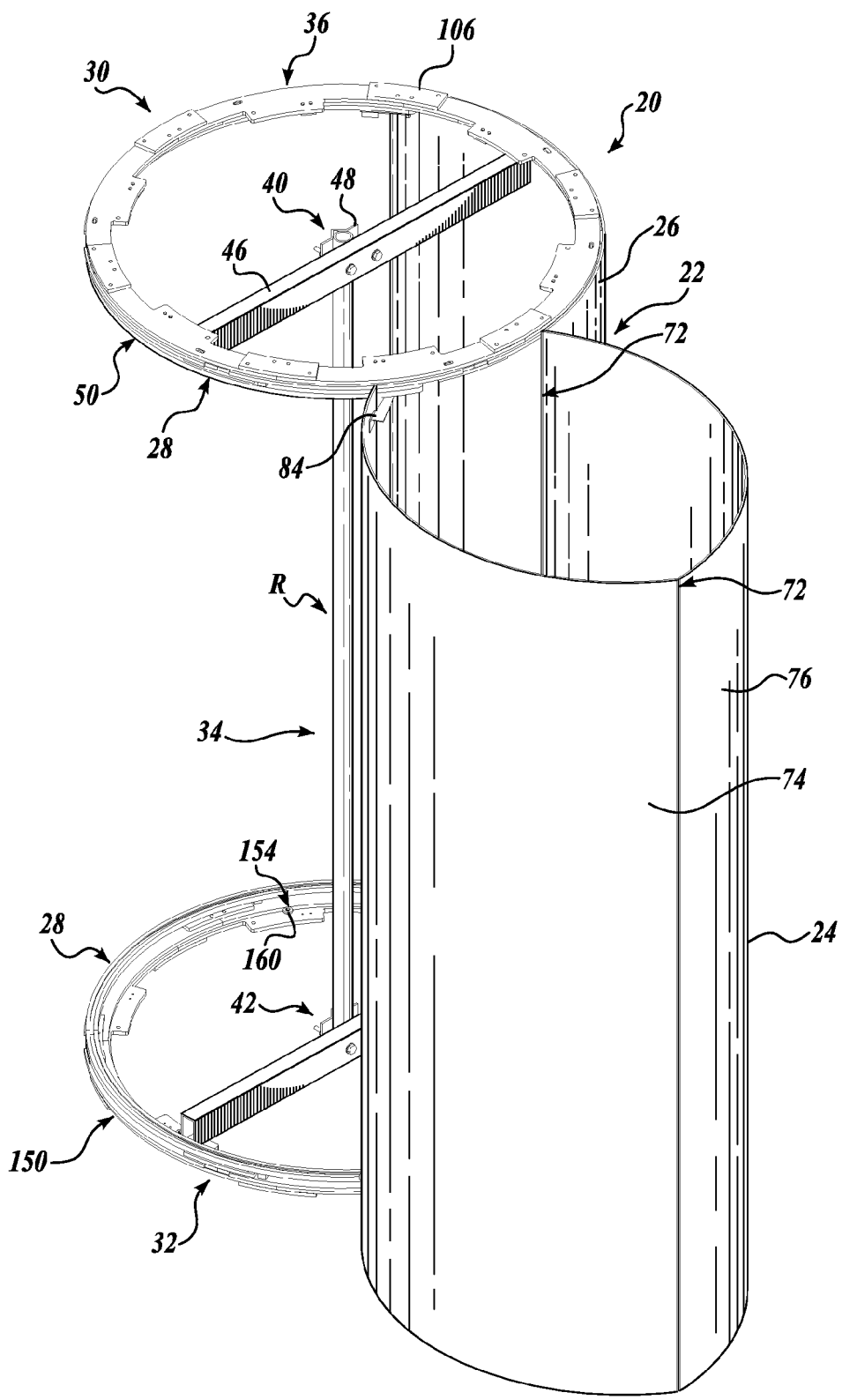
FIG. 4 is an isometric view of the shroud assembly of FIG. 1 with the door in an opened position and the cover assembly rotated with respect to the communication site.

Referring to FIGS. 3 and 4, at or near its first and second ends 30 and 32, the shroud assembly 20 includes a mounting assembly 36 including respective first and second mounting systems 40 and 42 for mounting the shroud assembly 20 at the communication site C. In the illustrated embodiment, the first mounting system 40 at the first end 30 includes a mounting portion 44 fixedly coupled to a cross bar 46. The cross bar 46 includes a bracket 48 for attaching to a rod R in the communication site C. In some embodiments, the mounting system 40 may have one or more cross bars 46 to support the shroud assembly 20 on the communication site C.

Likewise, the second mounting system 42 is substantially similar to the first mounting system 40.

In the illustrated embodiment, mounting portion 44 is shown as a mounting ring; however, other configurations are within the scope of the present disclosure. Mounting portion 44 may be manufactured as a single component, or may be constructed from multiple components that are tied together either, for example, in an overlapping configuration or with mounting portion tie bracket 106. As non-limiting examples, mounting portion 44 may be mountable to structures in different mounting configurations, such as a spoke configuration (see, e.g., FIG. 30), or may be directly mounted to a surface, such as a roof, plate, disk, or other suitable mounting surface.

Although shown as including two mounting systems 40 and 42 in the illustrative embodiment for stabilization of the assembly 20 on the communication site C, other mounting configurations are within the scope of the present disclosure. For example, in one embodiment of the present disclosure, the assembly 20 may include only one of the two mounting systems 40 and 42. In another embodiment, the assembly 20 may include more than two mounting systems.

The mounting systems 40 and 42 may include metal components, and therefore, may be positioned along the height of the communication site C so as not to interfere with communication from the communication site C.

In the illustrated embodiment, the mounting systems 40 and 42 are not configured to rotate. However, comparing the orientation of the cover assembly 22 in FIGS. 3 and 4, the shroud assembly 20 may be configured to include a rotation assembly 38 (see FIGS. 5-9), so as to enable rotation of the cover assembly 22 relative to the communication site C and the mounting assembly 36. As can be seen in FIG. 3, the wall portion 26 is coupled to the mounting assembly 36 with wall portion brackets 110 and 112. In other embodiments within the scope of the present disclosure, the mounting assembly 36 itself may be configured for rotational mounting relative to the communication site C, as opposed to including a separate rotational assembly for rotating the cover assembly 22 relative to the mounting assembly 36.

The advantage of rotation of the cover assembly 22 is that an operator can access the communication site C from any position on the perimeter of the shroud assembly 20 without the shroud assembly 20 needing to include multiple openable doors. Because of such rotational capability, the openable door portion 24 is rotatable to be positioned in any radial position relative to the communication site C.

Another advantage of a rotation is that the cover assembly 22 can be positioned relative to the communication site C for improved RF transparency. For example, a door portion 24 may provide reduced RF transparency compared to a wall portion 26. By rotating the cover assembly 22, the door portion 24 can be positioned in a radial position relative to the communication site C to least inhibit RF transparency.

The rotation assembly 38 will now be described with reference to FIGS. 5-9. First, referring to FIGS. 5-7, close-up views of the first (upper) rotation system 50 in the illustrated embodiment of the shroud assembly 20 of FIGS. 2-4 are provided. Rotation of the shroud assembly 20 is achieved by a rotation system 50 including at least one rotating portion 52 and a bearing assembly 54 supported by mounting system 40. In the illustrated embodiment, rotating portion 52 is shown as a rotating ring; however, other configurations are within the scope of the present disclosure.

Figure 5:
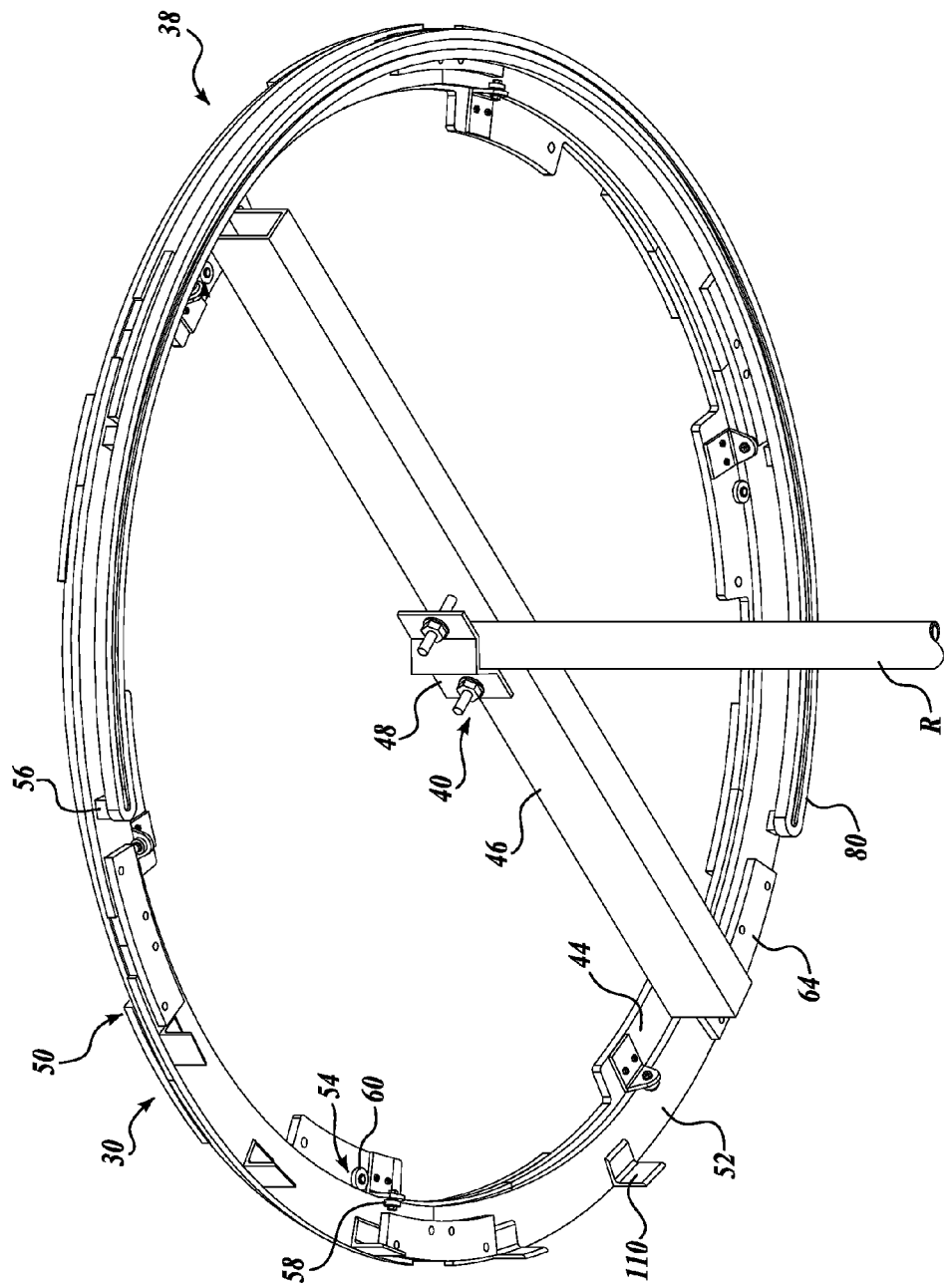
FIG. 5 is an isometric view of the underside of the mounting system of the first end of the shroud assembly of FIG. 1.
Figure 6:
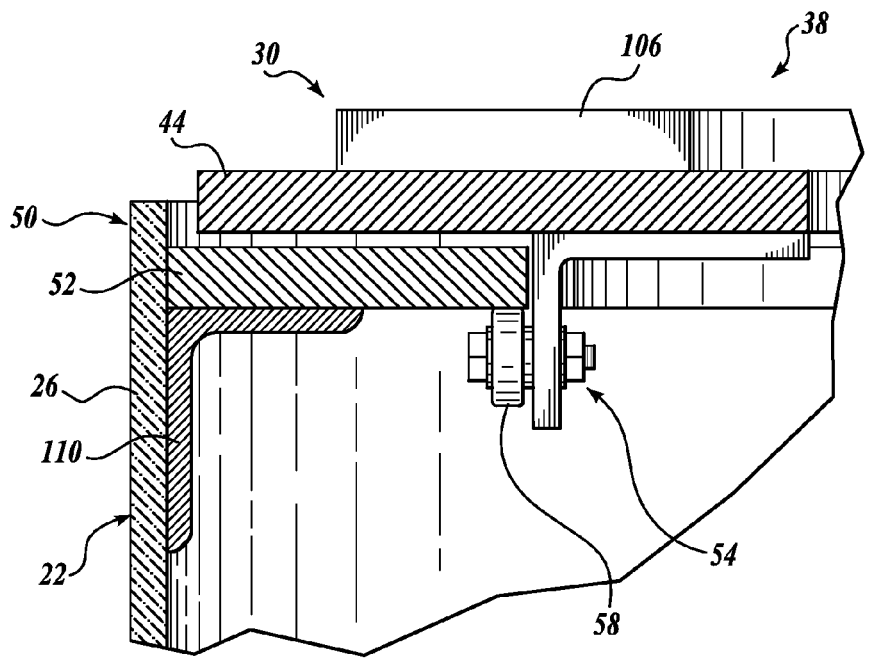
FIGS. 6 and 7 are cross-sectional side views of a portion of the rotation system of the first end of the shroud assembly of FIG. 1.
Figure 7:
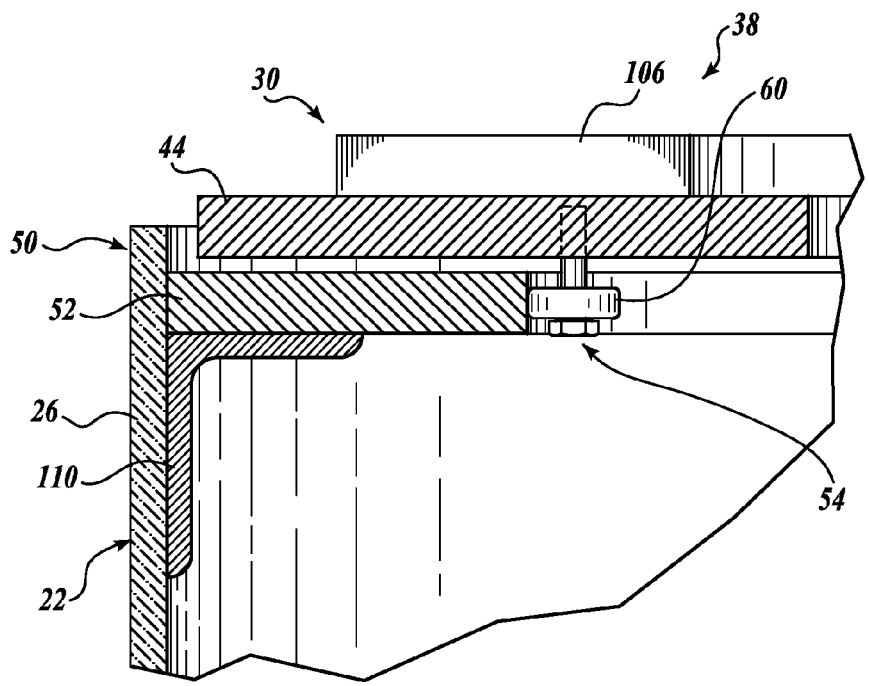

As can be seen in FIG. 5, bearing assembly 54 is coupled to mounting portion 44 and includes a bearing 58 in a vertical orientation (see FIG. 6) and bearing 60 in a horizontal orientation (see FIG. 7). As can be seen in FIG. 6, mounting portion 44 provides translational support to the cover assembly 22 through bearing 58. Although supported in translation, cover assembly 22 is configured for easy rotation relative to the mounting portion 44 by the bearing assembly 54.

As can be seen in FIG. 7, bearing 60 is coupled to mounting portion 44 and acts to provide lateral support and center the cover assembly 22 during rotation. In the illustrated embodiment, mounting portion 44 provides axial positioning to the cover assembly 22 through bearing 60 of bearing assembly 54.

In the illustrated embodiment, the bearing assembly 54 includes a plurality of wheel bearings 58 and 60 attached to the underside of the mounting portion 44. However, other bearing surfaces are within the scope of the present disclosure. As non-limiting examples, rotation can be achieved by making use of an interface of self-lubricating, low friction surfaces, or may use different bearings types, such as needle or ball bearings.

Figure 8:
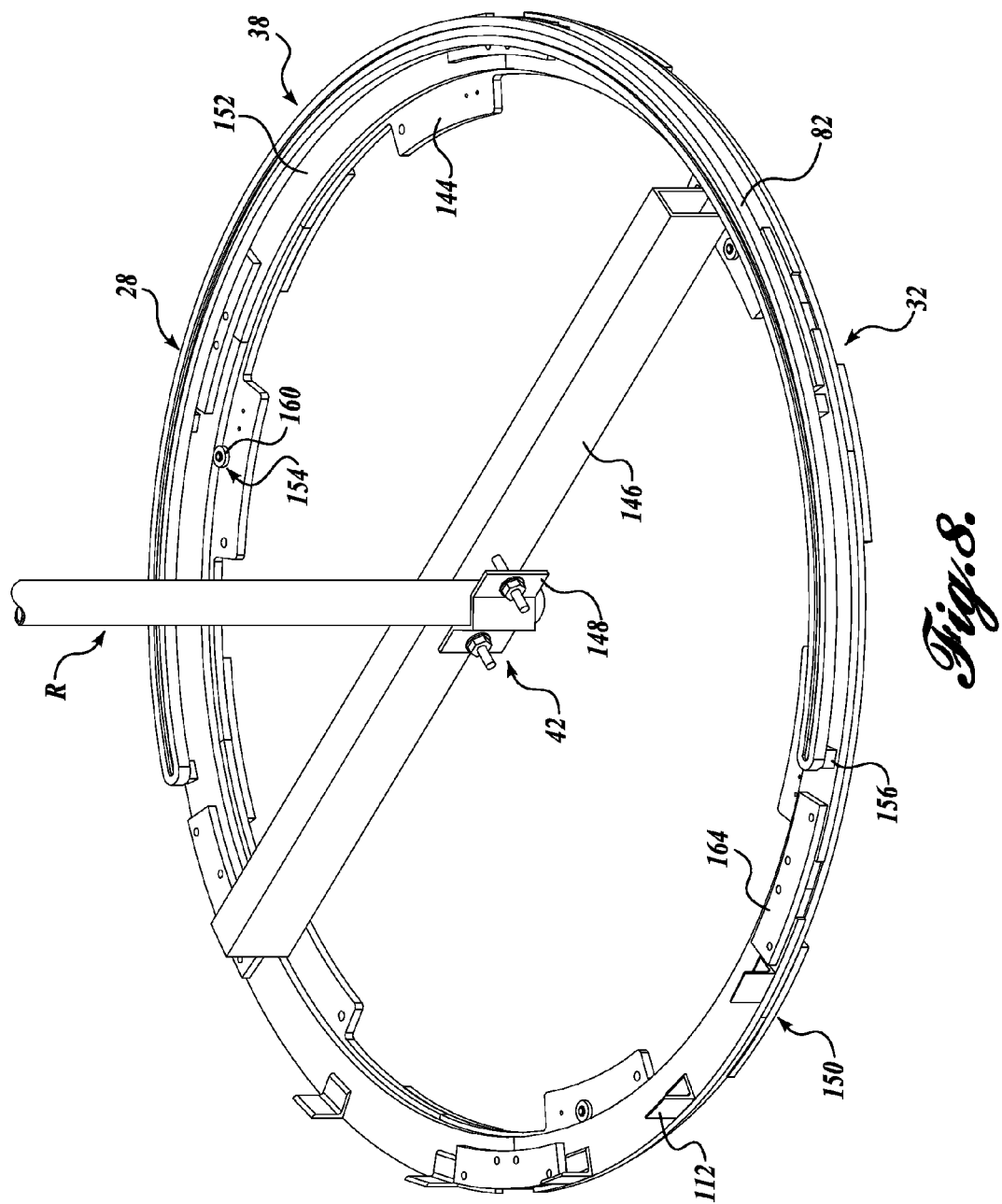
FIG. 8 is an isometric view of the mounting system of the second end of the shroud assembly of FIG. 1.
Figure 9:
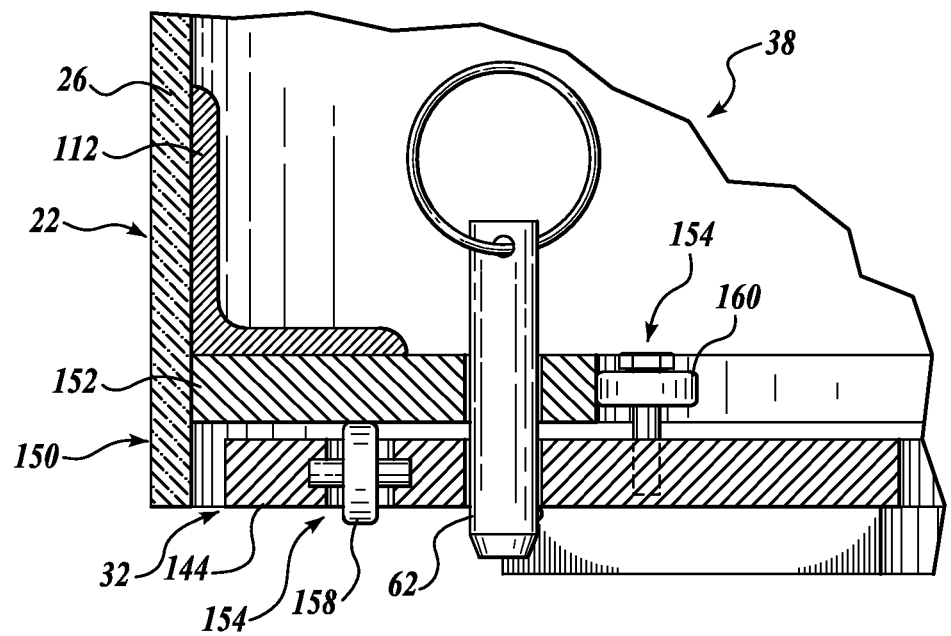
FIG. 9 is a cross-sectional side view of a portion of the rotation system of the second end of the shroud assembly of FIG. 1.

Next, referring to FIGS. 8 and 9, close-up views of the second (lower) rotation system 150 in the illustrated embodiment of the shroud assembly 20 of FIGS. 2-4 are provided. Bearing assembly 154 is coupled to mounting portion 144 and includes bearings 158 and 160, similar to the first rotation system 50 described above.

As seen in FIGS. 5-9, the rotation assembly 38 of the illustrated embodiment includes first and second rotating systems 50 and 150 and bearing assemblies 54 and 154. However, one rotating portion and bearing assembly may be sufficient in the shroud assembly 20 to enable rotation. The rotating system 50, like the mounting assembly 36, may include metal components, and therefore, may be positioned along the height of the communication site C so as not to interfere with communication from the communication site C.

Rotating portions 52 and 152 may be manufactured as a single component, or may be constructed from multiple components that are tied together, for example, in an overlapping configuration or with rotating portion tie brackets 64 or 164, as can be seen in FIG. 5 (upper rotation system 50) and FIG. 8 (lower rotation system 150). As can be seen in FIGS. 5 and 8, track mounting supports 56 and 156 may be optionally used to couple the respective tracks 80 and 82 of track system 28 to the rotating portions 52 and 152 of the rotating assembly 38. For increased support, tie brackets 64 and 164 may provide additional coupling locations for tracks 80 and 82 of track system 28.

Referring to FIG. 9, the rotation assembly 38 may also include a stop system 62 to allow the operator to prevent rotation of the cover assembly 22 relative to the communication site C, for example, while servicing the components in the inner chamber 34. In the illustrated embodiment, the stop system 62 is shown as a removable pin that is inserted through a hole in the rotating portion 152 and through a hole in the mounting portion 144 to stop the rotation of the rotation assembly 38. However, other stopping mechanisms are within the scope of the present disclosure, for example, clamps may be used to stop the rotation of the cover assembly 22. Likewise, although the illustrated embodiment shows the stop system 62 near the second (bottom) shroud end 32, the stop system 62 may be installed near the first (top) shroud end 30.

As mentioned above, the door portion 24 may be openable and closable relative to the shroud panel by being movable along a track system 28 (compare FIGS. 2 and 3). In the illustrated embodiment, the shroud assembly 20 includes first and second tracks 80 and 82 for guiding the door portion 24 as shown in FIG. 3. However, in certain embodiments, one track may be sufficient. In other embodiments, the shroud assembly 20 may not include any track system.

As seen in FIGS. 5 and 8, the first and second tracks 80 and 82 are shown as having open tracks for receiving track bearings assembly 88. Other tracks configurations, for example, as can be seen in the alternate embodiments of FIGS. 15-18, are within the scope of the present disclosure. Track configurations may be designed to match the contours of the track bearing assembly 88, such that the track bearing assembly does not "pop" out of the tracks 80 and 82. The track bearing design is particularly advantageous for the upper track 80, because the force of gravity can cause the bearing assembly 88 to come out of the track 80 unless there is a support below the bearing assembly 88.

Figure 12:
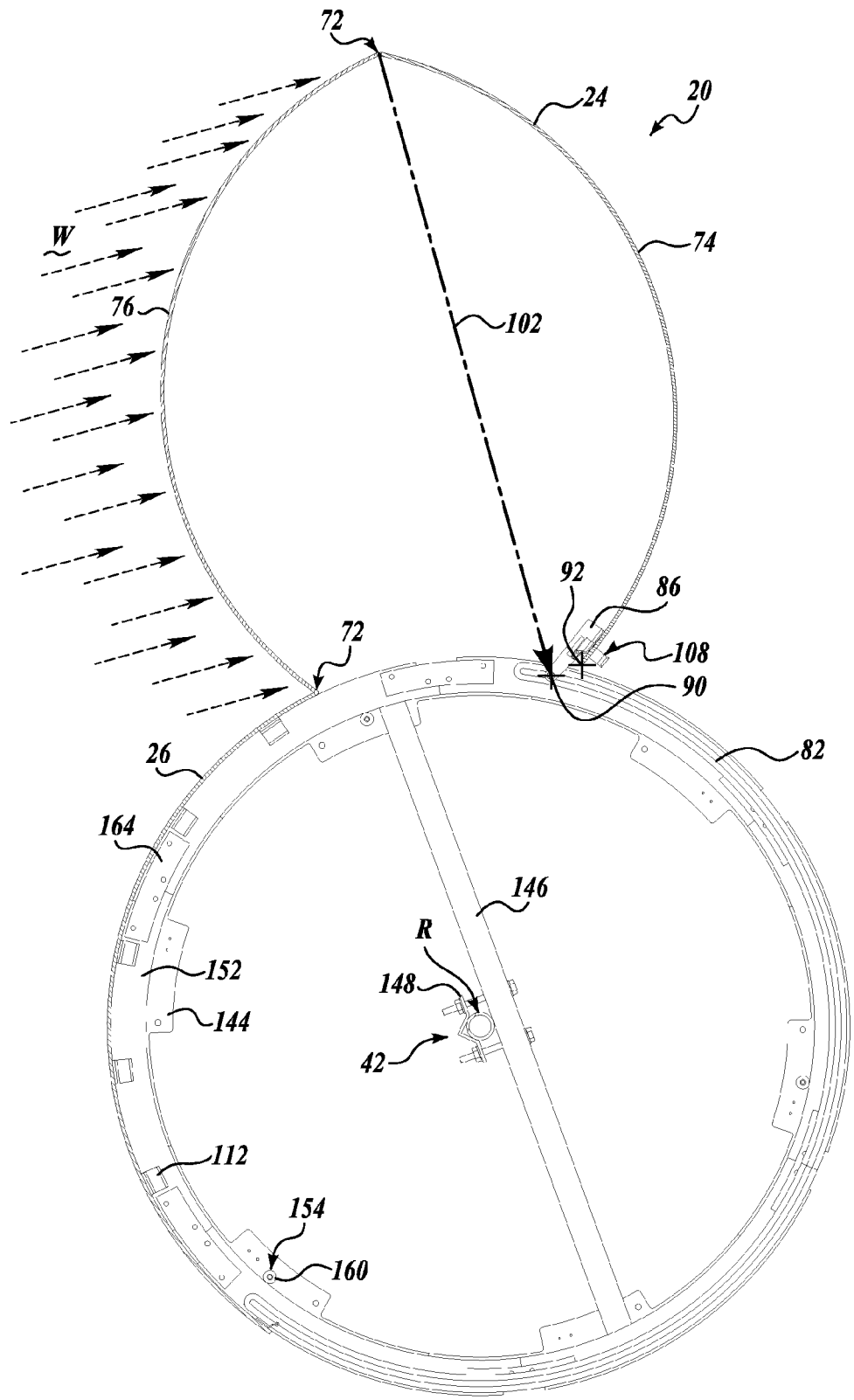
FIG. 12 is a top view of the shroud assembly of FIG. 1 with the door in a fully-opened position.

Because the shroud assembly 20 has a circular cross-section in the illustrated embodiment, the tracks 80 and 82 are configured to be arcuate in shape, defining a portion of a circle (see FIG. 12). However, other non-circular track configurations are also within the scope of the present disclosure, for example, other types of arcuate, oval-shaped, or even polygonal shaped tracks. Although bearing assemblies may travel more easily through curved tracks, tracks having corner turns are also within the scope of the present disclosure.

Figure 10:
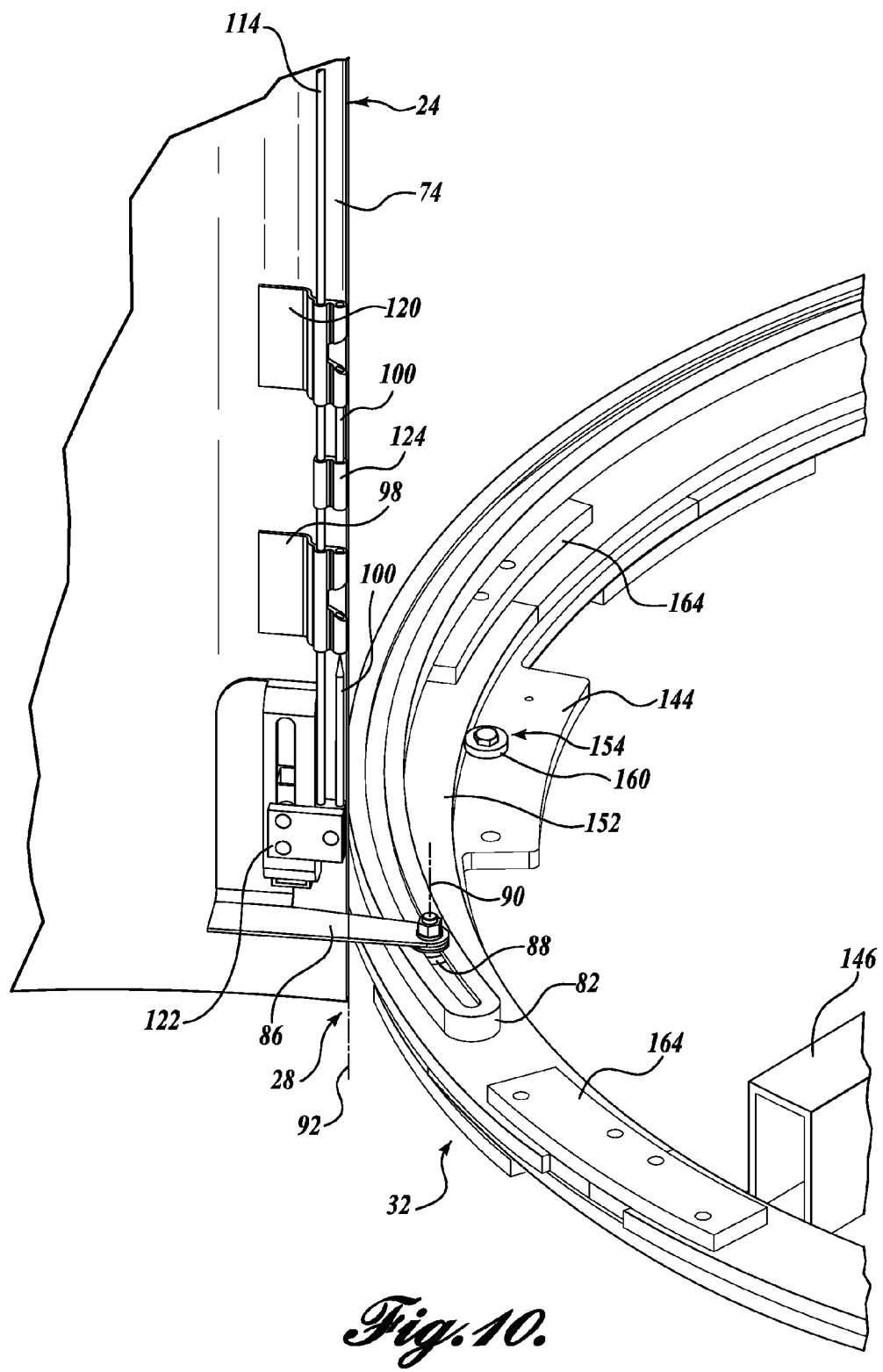
FIG. 10 is a close-up perspective view of the inner chamber of the shroud assembly of FIG. 1 showing the door track system.
Figure 11:
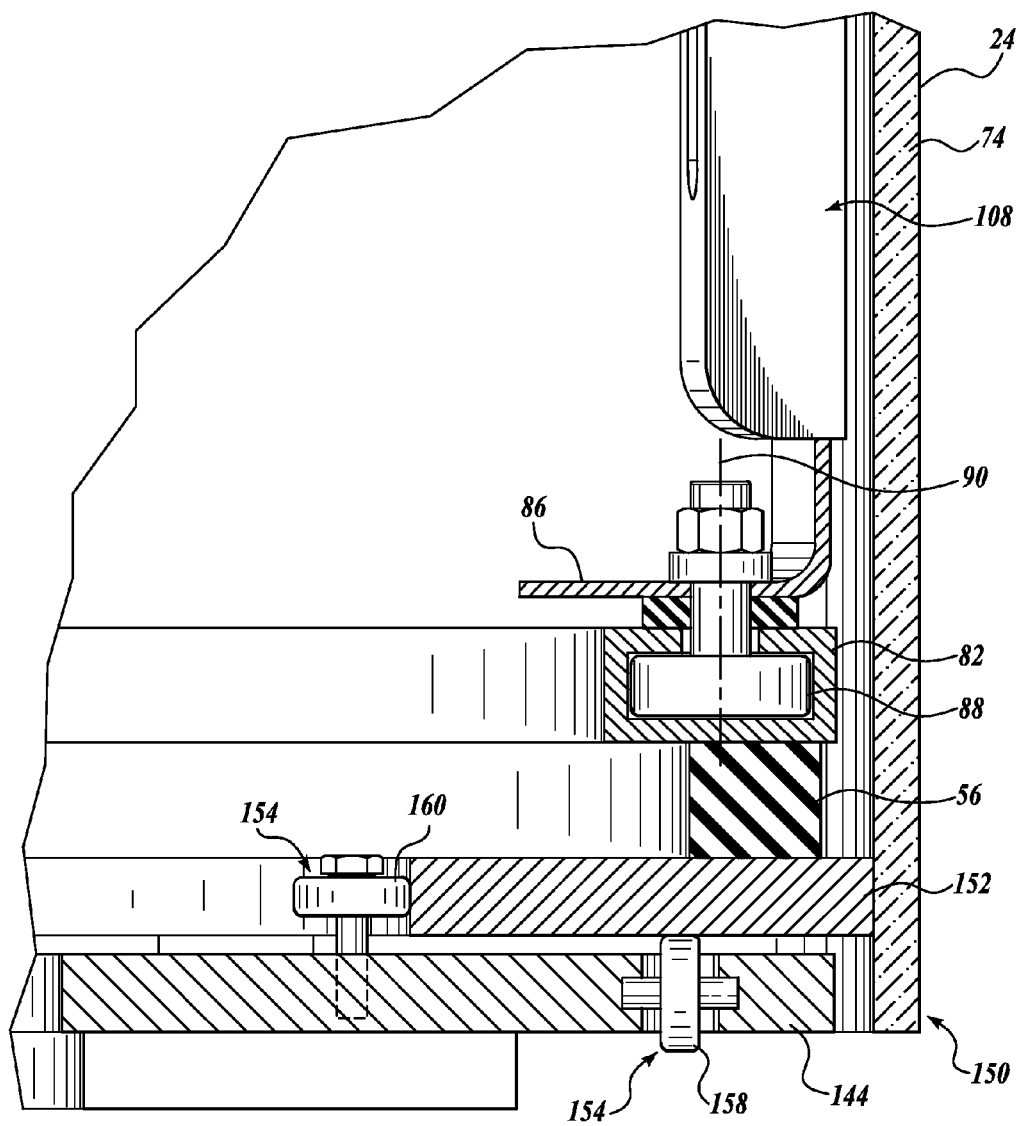
FIG. 11 is a cross-sectional side view of the door track system components and the rotation system components, including the track bearing assembly, of the shroud assembly of FIG. 1.

Referring to FIGS. 10 and 11, the lower track 82 is illustrated, with track bearing 88 shown as being configured to move within the track 82. Track arm 86 is positioned to be coupled to the first panel 74 of the door portion 24. The track arms 86 extends a length beyond the first panel 74 to space the door edge 92 from the pivot point 90 of the track arm 86 in the track 82. Such positioning allows for complete movement of the track arm 86 through track 82 without the door portion 24 interfering with the movement of the track arm 86 in the track 82.

Although not illustrated in the drawings, upper track 80 is substantially similar to lower track 82 but in a reverse configuration, including upper track arm 84, relative to the door portion 24. The illustrated embodiment includes upper and lower tracks 80 and 82; however, some embodiments of the present disclosure may only include one track 80 or 82.

In this configuration, the track system 28 provides resistance to shutting for the door portion 24 when exposed to wind. Referring to FIG. 12, a door closing vector 102 is defined between the hinged coupling 72, between the first and second door panels 74 and 76, and the pivot point 90 of the track arm 86. When the door portion 24 is in the fully-opened position, as shown in FIG. 12, the door closing vector 102 is not tangential to the circular track 82 at pivot point 90. Wind force W pressing against second door panel 76 will generally act on pivot point 90 in the direction of door closing vector 102, and in this configuration, will not advance the track bearing 88 within the track 82. As a result, the door portion 24 stays in an opened position, even if second door panel 76 is subjected to the wind force W.

Figure 13:
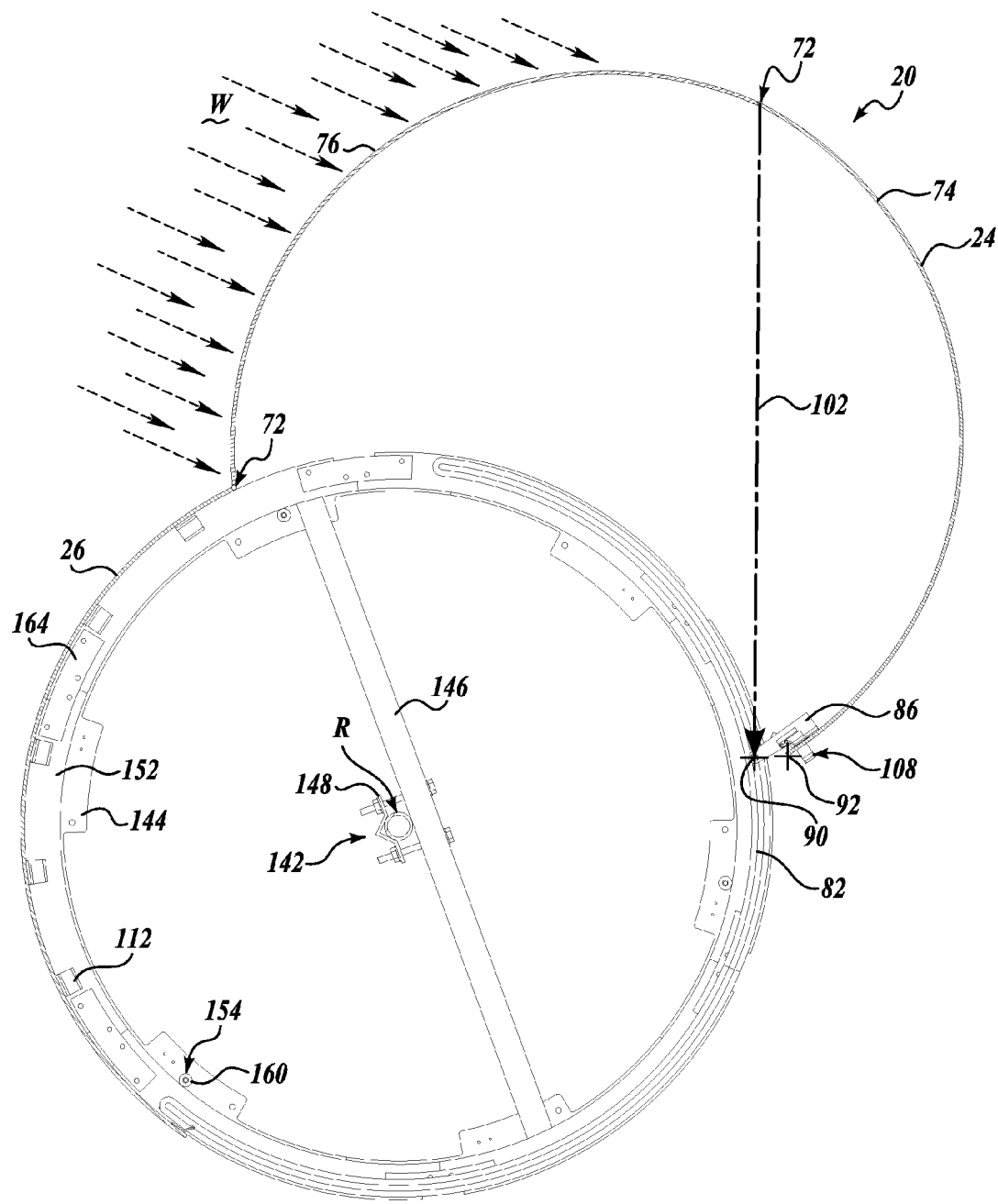
FIG. 13 is a top view of the shroud assembly of FIG. 1 with the door in a partially-opened position.

Referring now to FIG. 13, the door closing vector 102 is nearly tangential to circular track 82 at pivot point 90. In this orientation, wind pressing against second door panel 76 may cause the door portion 24 to close relative to the wall portion 26.

As described above, hinged couplings 72 used in the shroud assembly 20, for example, between the door portion 24 and the wall portion 26 and between first and second door panels 74 and 76 of the door portion 24, may be RF transparent. Referring to FIG. 14, hinged couplings 72 in accordance with embodiments of the present disclosure may include hinges 70 and a hinge pin 78.

As a non-limiting example, the hinges 70 may be made from a fiberglass lay-up using continuous fibers. However, injection molded fiberglass hinges using milled fibers are also within the scope of the present disclosure. The advantage of a fiberglass lay-up of continuous fibers is that continuous fibers provide enhanced strength over milled fibers, and the profile of the hinge is more compact, reducing the risk of interference between the door portion 24 and the wall portion 26 during hinge rotation. In addition, other RF transparent materials, such as fibers, plastics, resins, or combinations of these materials, may be used to form the hinges.

The hinges 70 may be integrated during the manufacture of the wall portion 26, first door panel 74, and second door panel 76 such that the profile of the hinge is more compact, reducing the risk of interference between the door portion 24 and the wall portion 26 during hinge rotation.

In the illustrated embodiment, the hinge pin 78 is made from a continuous fiberglass rod. However, in other embodiments, discrete sections of rod may be used to create hinge pin 78. Likewise, other RF transparent materials, such as fibers, plastics, resins, structural foams, or combinations of these materials, such as a composite, may be used to form the hinges 70 and hinge pin 78.

Figure 15:
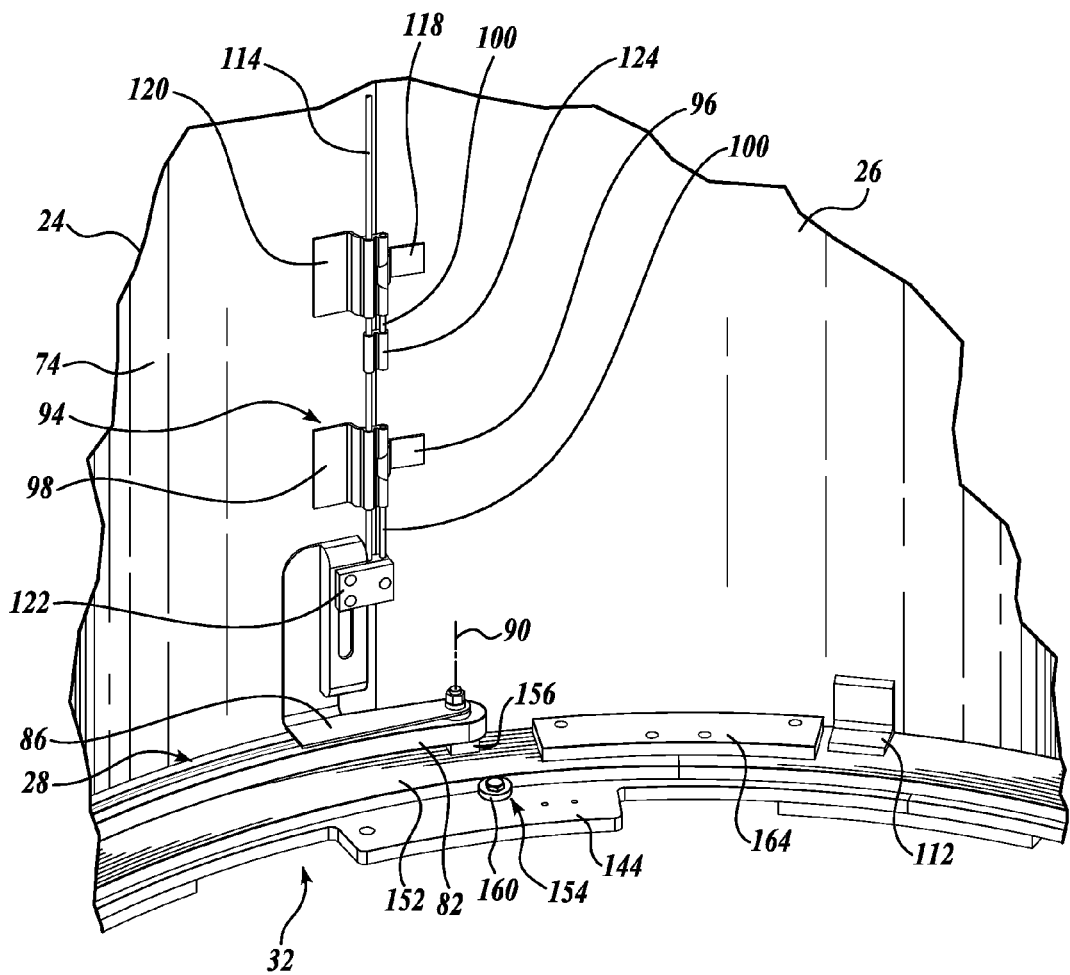
FIG. 15 is a close-up perspective view of the inner chamber of the shroud assembly of FIG. 1 showing a latch assembly in a closed position.

Returning to FIGS. 15 and 16, when the cover assembly 22 is in the closed position, the wall portion 26 and door portion 24 may be fixedly coupled using latch assembly 94. Latch assembly 94 includes at least one wall latch portion 96 and at least one door latch portion 98. When the cover assembly 22 is in the closed position, as shown in FIG. 15, a latch pin 100 is inserted through receptacles in the respective wall and door latch portions 96 and 98 to couple the wall portion 26 and door portion 24.

To provide additional latch integrity, the latch assembly 94 may include additional wall and door latch portions at various positions along the respective wall and door portions 26 and 24. In the illustrated embodiment, the latch assembly 94 includes a second wall latch portion 118 and a second door latch portion 120. In other embodiments, any number of latch pairs may be included, for example, positioning each latch pair at specific distances along the length of the door portion 24.

When using multiple wall and door latch portions at various positions along the respective wall and door portions 26 and 24, the latch assembly 94 may include a connecting assembly between latch pairs. In the illustrated embodiment, a connecting assembly shown as a connecting pin 114 is coupled to the handle assembly 108 (see FIG. 2) and also to the latch pins 100 by couplings 122 and 124. When the connecting pin 114 is moved from the first latched position (see FIG. 15) to the second unlatched position (see FIG. 16), the latch pins 100 disengage from the wall latch portions 96 and 118.

Figure 16:
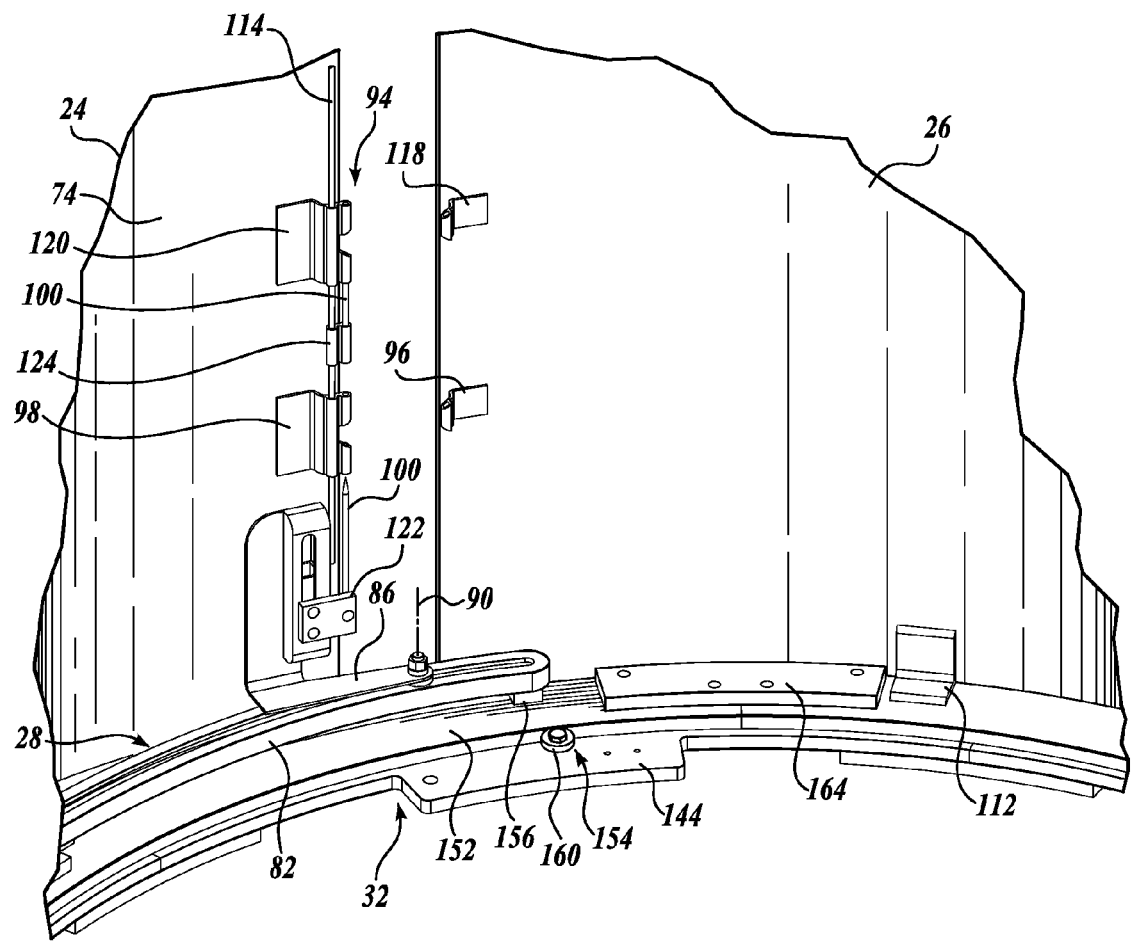
FIG. 16 is a close-up perspective view of the inner chamber of the shroud assembly of FIG. 1 showing the latch assembly in an opened position.
Figure 17:
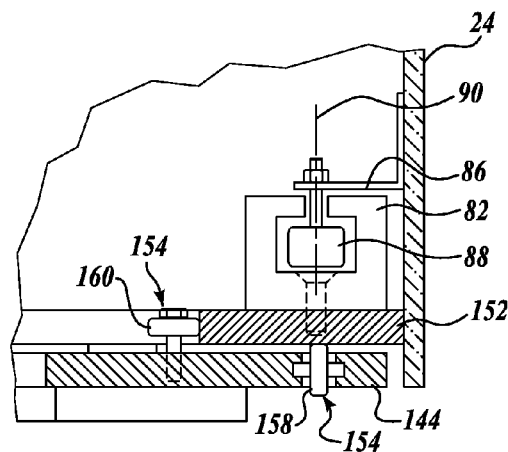
FIGS. 17-20 are cross-sectional side views of alternate embodiments of the door track system components of the shroud assembly of FIG. 1.
Figure 18:
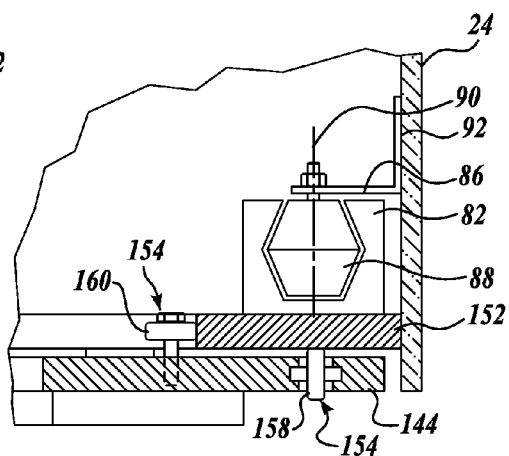
Figure 19:
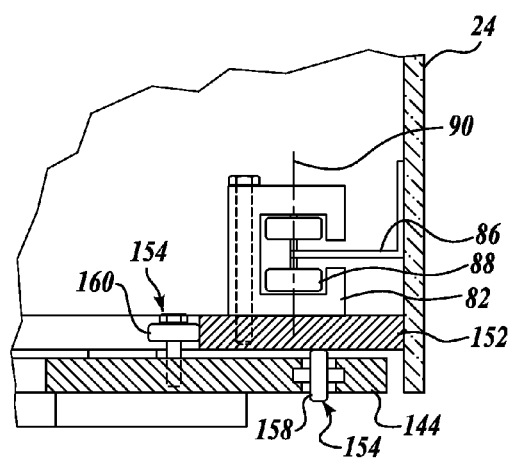
Figure 20:
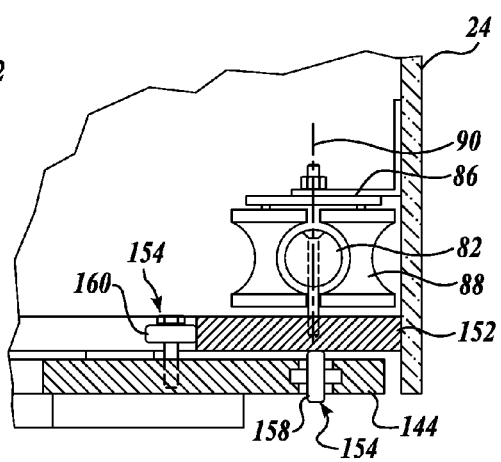

When the communication site C is opened, a handle assembly 108 (see FIG. 2) coupled to latch pin 100 can be used to slide the latch pin 100 out of the wall latch portions 96 and decouple the latch assembly 94. Such decoupling allows for opening of the door portion 24 with respect to the wall portion 26, as shown in FIG. 16.

The latch assembly 94, like the hinges 70, may be substantially RF transparent and may be manufactured from non-metallic materials, such as fiberglass lay-up sheets.

In use, a technician will be elevated to gain access to the shroud assembly 20 of the communication site C. The technician will unlatch the door portion to allow openability of the door portion relative to the wall portion. Then, the technician will open the door portion providing access into the inner chamber 34 of the shroud assembly 20. If the technician needs to access another area of the inner chamber 34, the technician may rotate the cover assembly 22, so that the door opening accesses another radial segment of the inner chamber 34. If rotation is not required, the technician may use stop system 62 to fix the radial position of the cover assembly with respect to communication site C.

Now referring to FIGS. 21-30, shroud assemblies in accordance with other embodiments of the present disclosure will be described in more detail. The shroud assemblies are substantially identical in materials and operation as the previously described embodiment, except for differences regarding the shape of the mounting assembly and cover assembly (FIGS. 21-29) and the mounting assembly configuration (FIG. 30), which will be described in greater detail below. For clarity in the ensuing descriptions, numeral references of like elements of the shroud assembly 20 are similar, but are in the 200 series for the illustrated embodiment of FIGS. 21-23, in the 300 series for the illustrated embodiment of FIGS. 24-26, in the 400 series for the illustrated embodiment of FIGS. 27-29, and in the 500 series for the illustrated embodiment of FIG. 30.

Figure 21:
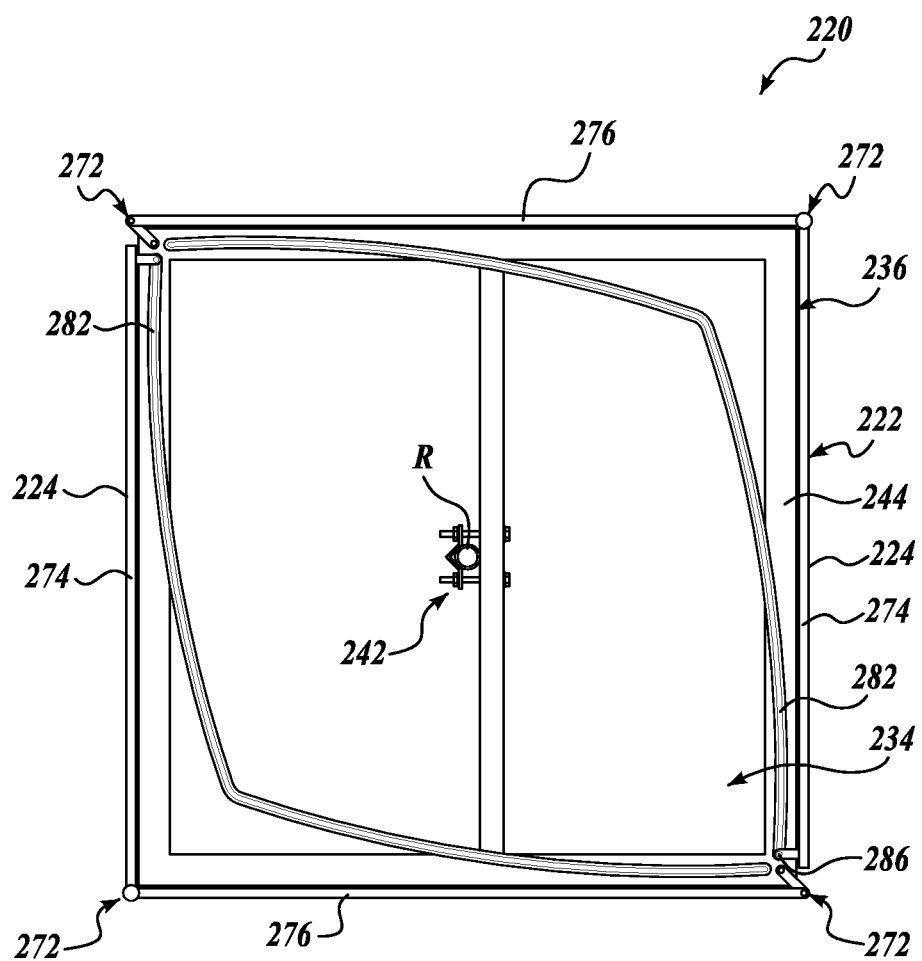
FIGS. 21-23 are top views of a shroud assembly for a communication site formed in accordance with another embodiment of the present disclosure showing the door in a respective closed, intermediate, and open positions.
Figure 22:
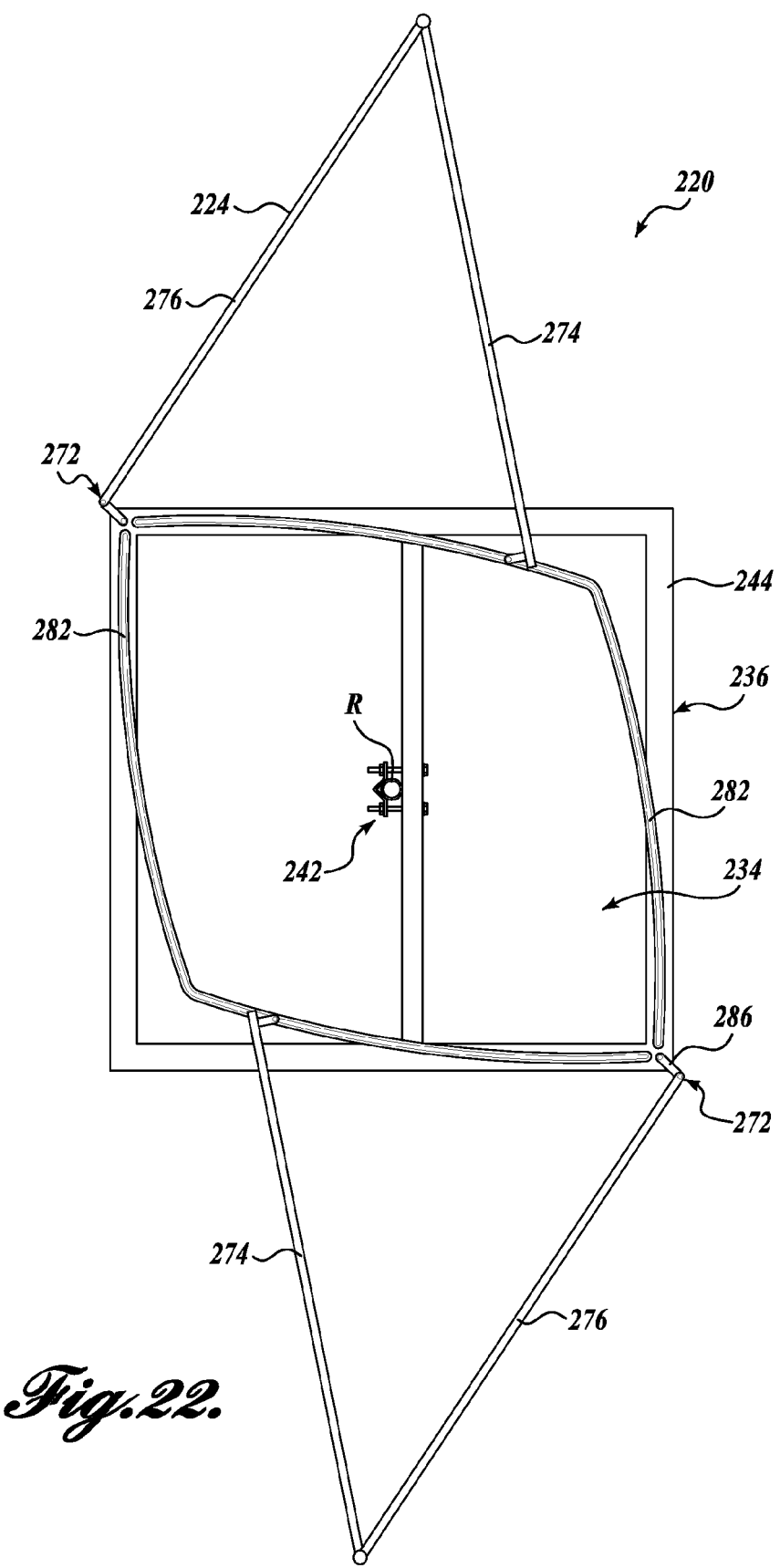
Figure 23:
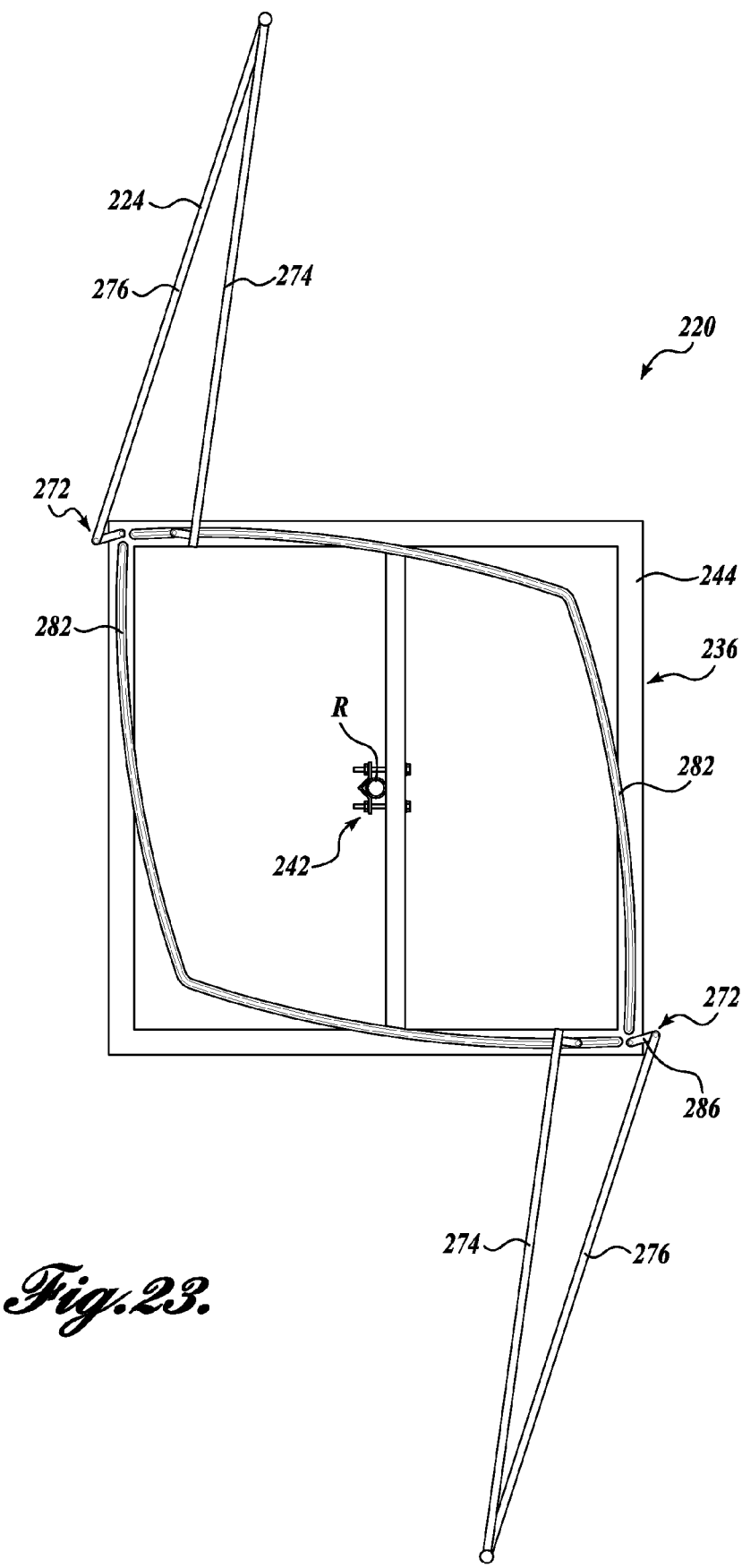

In the illustrated embodiments of FIGS. 21-23, the shroud assembly 220 includes a cover assembly 222 defining an inner chamber 234, wherein the cover assembly has a substantially rectangular (or square) cross-sectional shape when in the closed position (see FIG. 21). Likewise, the mounting assembly 236 is also substantially rectangular.

The cover assembly 222 includes at least one door portion 224 movably coupled to a mounting assembly 236. Like the previously described embodiment, the door portion 224 is a door assembly defining a folding door. In that regard, door assemblies 224, may include a hinged coupling 272 between first and second panels 274 and 276.

Door portion 224 is shown to be positioned in respective closed (FIG. 21), partially opened (FIG. 22), and fully opened (FIG. 23) positions relative to inner chamber 234. Door portion 224 may be openable and closable relative to the inner chamber 234 by being movable along a track system 228. As can be seen in the illustrated embodiment of FIGS. 21-23, the shroud assembly 220 may include an optional second door portion 224 to provide alternate access to the inner chamber 234.

As a result of the rectangular cross-section of the illustrated embodiment, various track shapes and door configurations are within the scope of the present disclosure. Referring to FIGS. 21-23, an arcuate track 282 guides track arm 286 of the first panel 274 such that the first and second panels 274 and 276 move in combination around pivot point 272, resulting in door portion 224 being movable between closed, partially opened, and fully opened positions.

Figure 24:
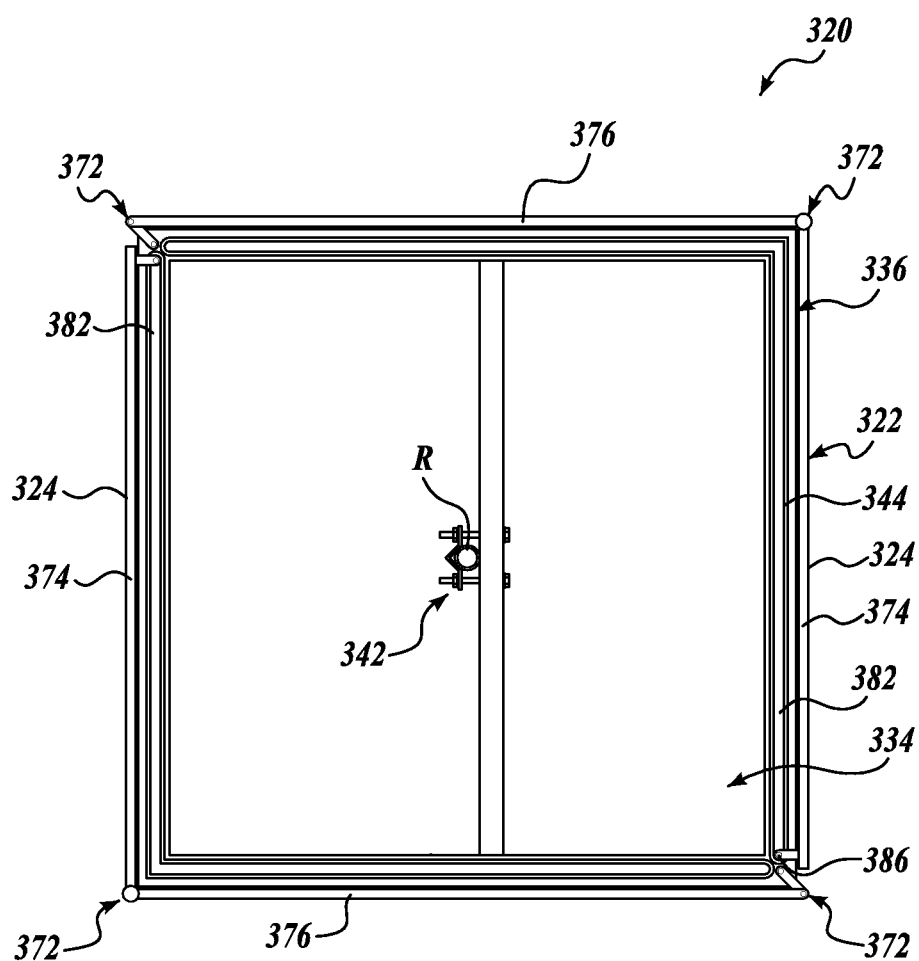
FIGS. 24-26 are top views of a shroud assembly for a communication site formed in accordance with another embodiment of the present disclosure showing the door in a respective closed, intermediate, and open positions.
Figure 25:
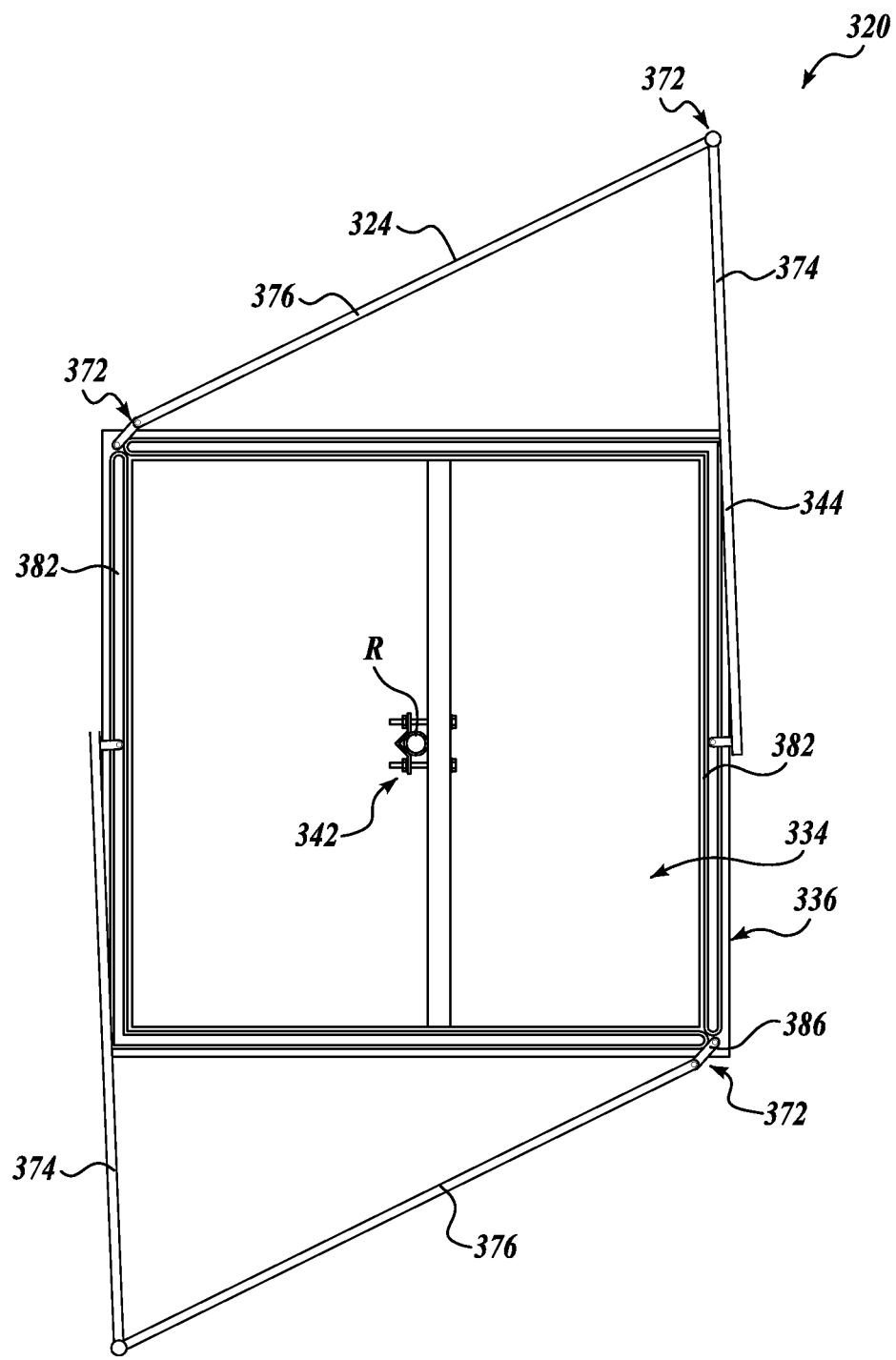
Figure 26:
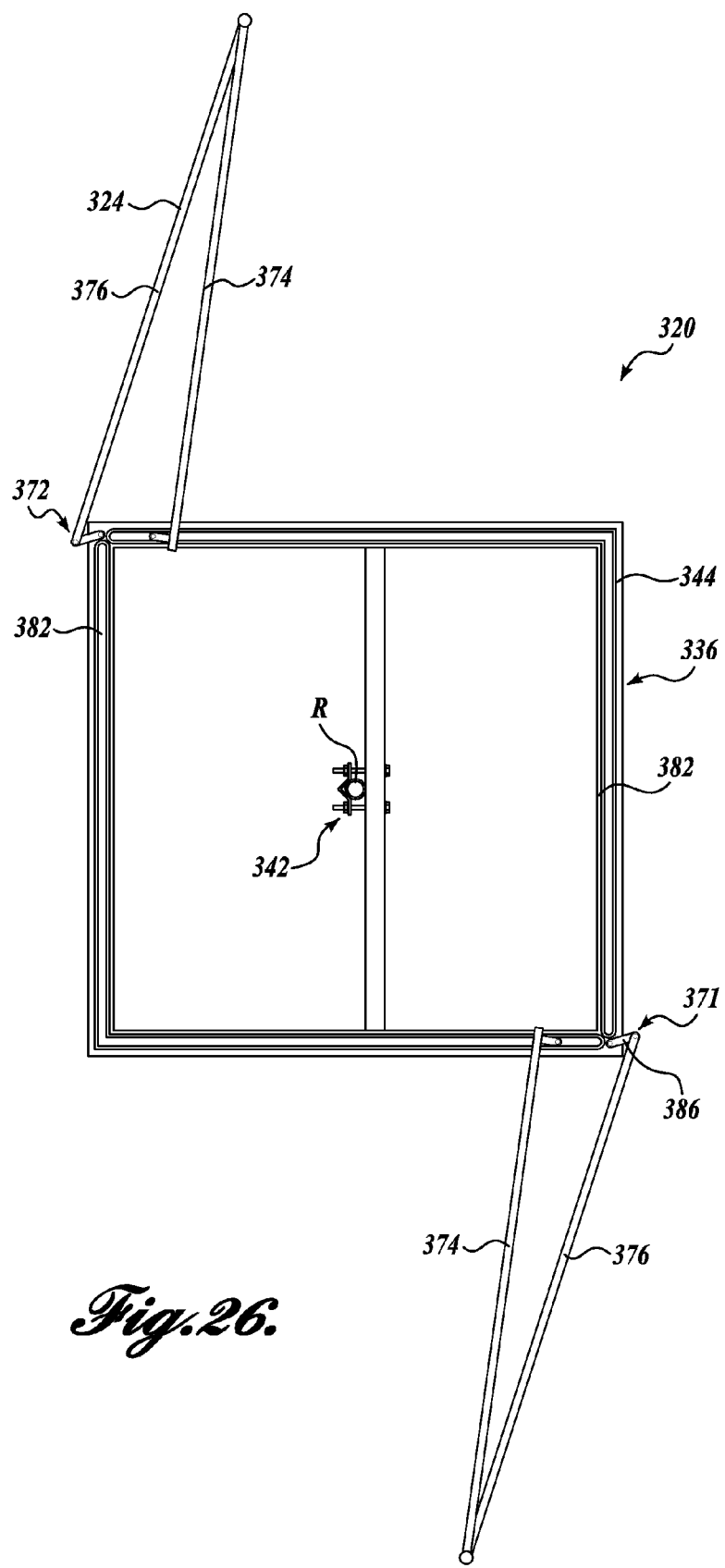

Referring now to the alternate embodiment of FIGS. 24-26, polygonal track 382 guides track arm 386 of the first panel 374 such that the first and second panels 374 and 376 move in combination around pivot point 372, resulting in door portion 324 being movable between closed, partially opened, and fully opened positions. Like the illustrated embodiment of FIGS. 21-23, the shroud assembly 320 of FIGS. 24-26 may also include an optional second door portion 324 to provide alternate access to the inner chamber 334.

Figure 27:
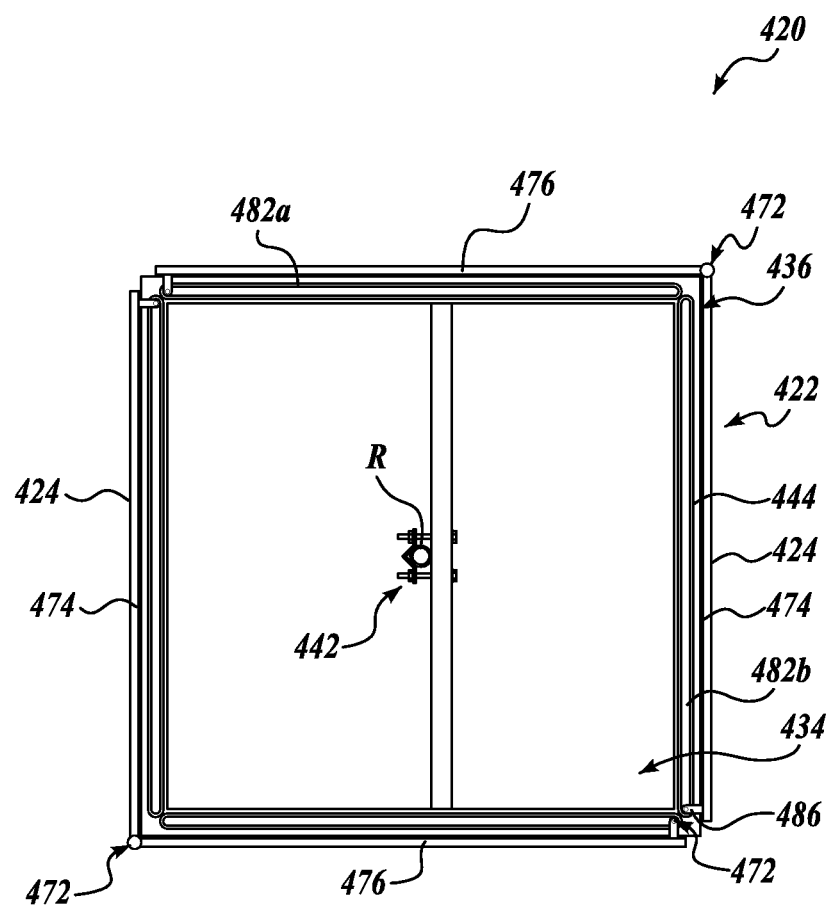
FIGS. 27-29 are top views of a shroud assembly for a communication site formed in accordance with another embodiment of the present disclosure showing the door in a respective closed, intermediate, and open positions.
Figure 28:
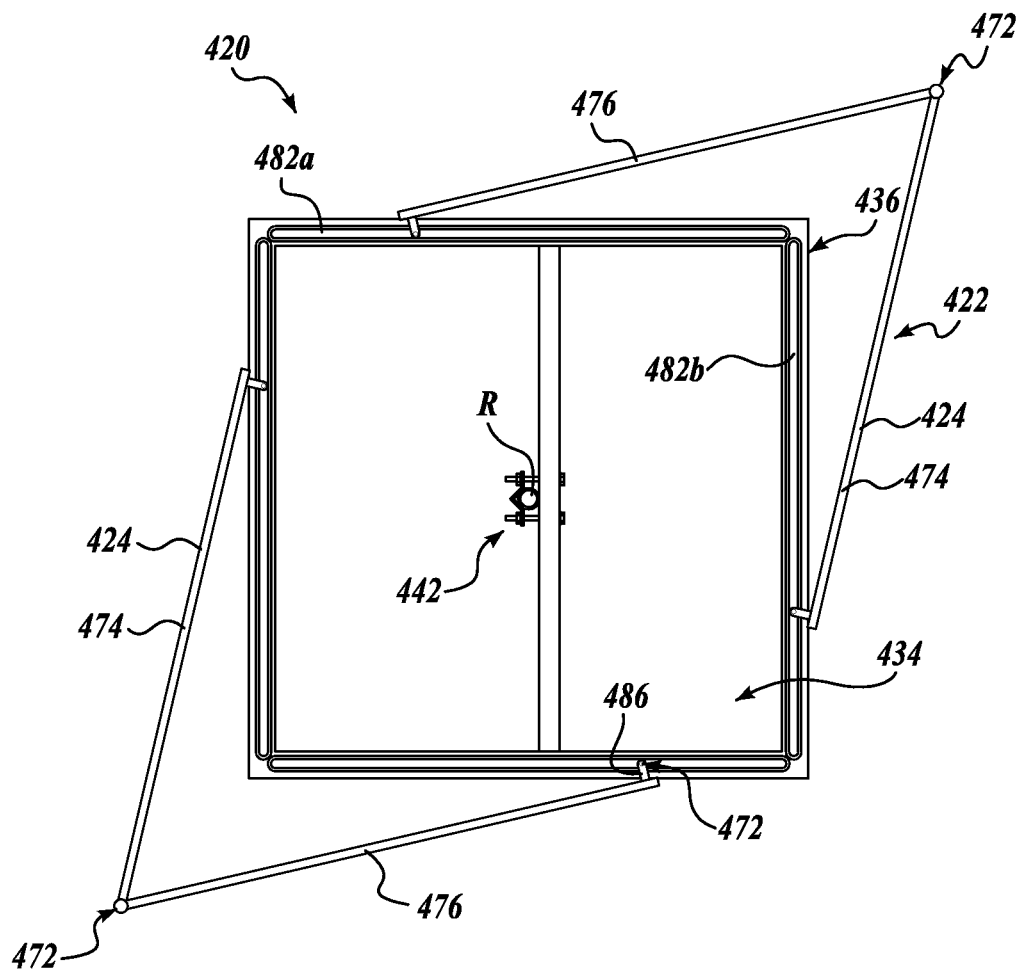
Figure 29:
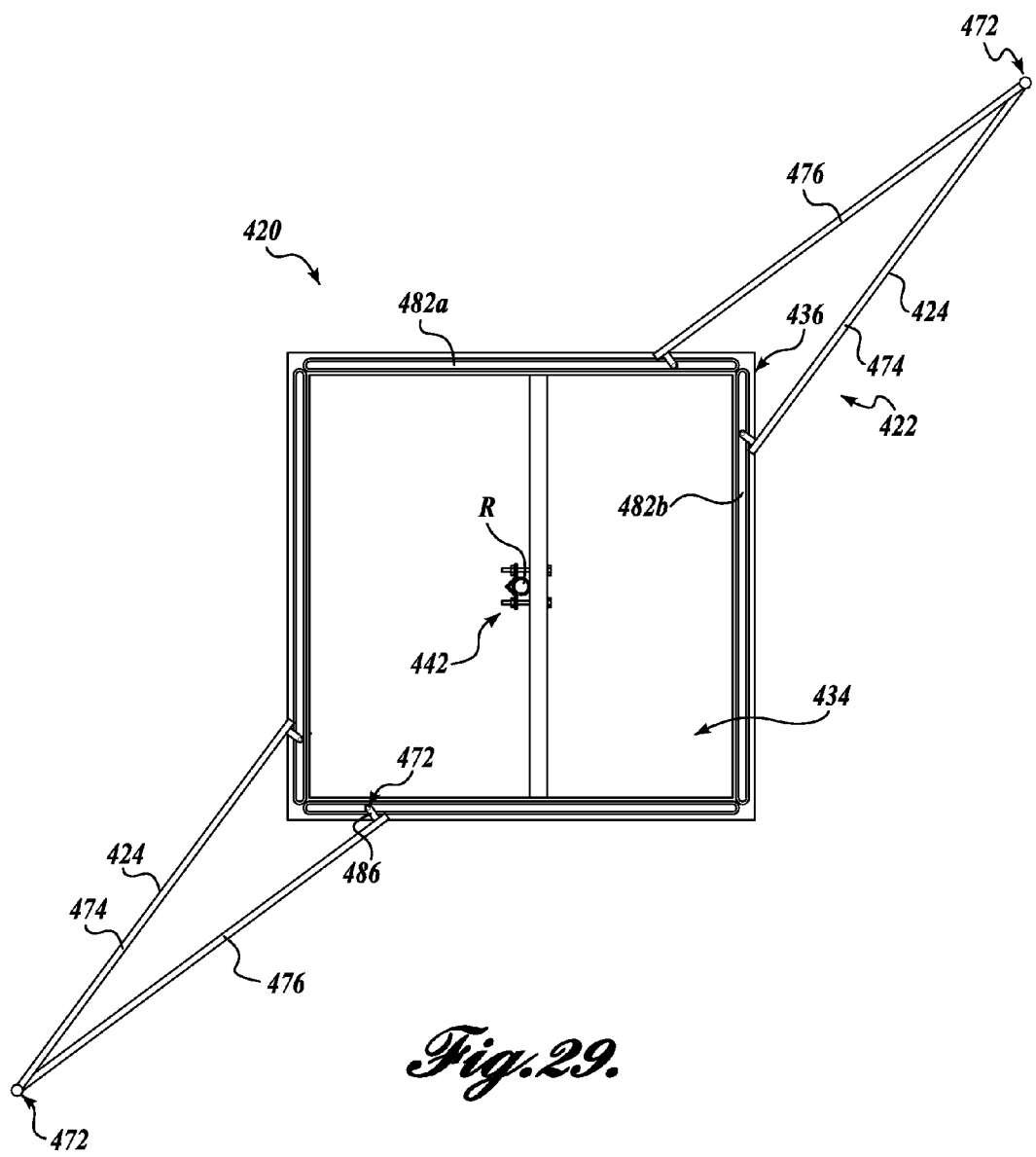

Referring now to the alternate embodiment of FIGS. 27-29, discrete linear tracks 482a and 482b guide each track arm 486 of the first and second panels 474 and 476 such that the door portion 424 is movable between closed, partially opened, and fully opened positions by each door portion 474 and 476 being movable only in discrete linear tracks 482a and 482b.

Like the illustrated embodiment of FIGS. 21-23, the shroud assemblies 320 of FIGS. 24-26 and 420 of FIGS. 27-29 may also include an optional second door portion 424 to provide alternate access to the inner chamber 434. In some embodiments, the cover assemblies may include more than two door portions.

Referring now to the alternate embodiment of FIG. 30, the communication site C2 includes a top surface T coupling interface for coupling with the shroud assembly 520. In that regard, the top surface T of the communication site C2, has a significantly larger diameter than rod R in the embodiment shown in FIG. 3, but a smaller diameter than the shroud assembly 520. To interface with the top surface T of the communication site C2, the mounting assembly 536 includes mounting portions 518 extending radially inwardly from mounting portion 544 for mounting the shroud assembly 520 on top of the communication site C2. The mounting portions 518 can be coupled to the communication site C2 using fasteners (not shown) or any other suitable coupling system.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A shroud assembly for a communication site, the shroud assembly comprising:
   (a) a wall portion;
   (b) a door portion having a first end and a second end movably coupled to the wall portion, wherein the door portion is configured for selective positioning in at least first and second positions relative to the wall portion, wherein the door portion is in a closed position when in the first position with the first and second ends of the door portion coupled to the wall portion and wherein the door portion is in an open position when in the second position with the first end of the door portion coupled to the wall portion, wherein the wall portion and the door portion define a cover assembly having an inner chamber, and wherein the inner chamber can be accessed when the door portion is in the open position, wherein the shroud assembly has a substantially circular cross-section when the door portion is in the first position, wherein the door portion includes first and second door panels hingedly coupled to one another and wherein the door portion is hingedly coupled to the wall portion such that the door portion is in a folded configuration when in the second position; and
   (c) a rotation assembly for allowing circumferential rotation of the entire cover assembly relative to the communication site.

2. The shroud assembly of claim 1, wherein the cover assembly is configured for surrounding at least a portion of the communication site.

3. The shroud assembly of claim 1, wherein the cover assembly is substantially radio-frequency transparent.

4. The shroud assembly of claim 1, wherein the cover assembly is substantially made from non-metallic materials.

5. The shroud assembly of claim 1, further comprising a stopping device for selectively stopping circumferential rotation.

6. The shroud assembly of claim 1, wherein the door portion is hingedly coupled to the wall portion by a hinge assembly.

7. The shroud assembly of claim 6, wherein one or more hinges in the hinge assembly are radio frequency transparent.

8. The shroud assembly of claim 6, wherein one or more hinges in the hinge assembly are made from non-metallic materials.

9. The shroud assembly of claim 6, wherein one or more hinges in the hinge assembly are made from a material including fiberglass, fibers, plastics, resins, or combinations thereof.

10. The shroud assembly of claim 9, wherein one or more hinges in the hinge assembly are made by laying up multiple sheets of material.

11. The shroud assembly of claim 1, wherein the door portion includes at least first and second door panels.

12. The shroud assembly of claim 11, wherein the first and second door panels are hingedly coupled to one another.

13. The shroud assembly of claim 1, further comprising a track system operably coupled to the door portion.

14. The shroud assembly of claim 13, wherein the track system includes at least a first track.

15. The shroud assembly of claim 14, wherein the track system includes at least a second track.

16. The shroud assembly of claim 13, wherein the track system is designed to maintain the door portion in an opened position when the door portion is subjected to wind pressure.

17. The shroud assembly of claim 1, further comprising a mounting assembly for mounting the shroud assembly to the communication site.

18. A shroud assembly for a communication site, the shroud assembly comprising:
   (a) a wall portion;
   (b) a door portion having a first end and a second end movably coupled to the wall portion, wherein the door portion is configured for selective positioning in at least first and second positions relative to the wall portion, wherein the door portion is in a closed position when in the first position with the first and second ends of the door portion coupled to the wall portion and wherein the door portion is in an open position when in the second position with the first end of the door portion coupled to the wall portion, wherein the wall portion and the door portion define a cover assembly having an inner chamber, wherein the door portion includes first and second door panels each door panel having a first end and a second end, the second end of the first door panel hingedly coupled to the first end of the second door panel, and wherein the door portion is hingedly coupled to the wall portion such that the door portion is in a folded configuration when in the second position; and
   (c) a track system operably coupled to the door portion for sliding movement of the door portion relative to the wall portion, wherein the door portion moves in the track system when it moves for selective positioning in at least the first and second positions relative to the wall portion, wherein the first door panel is coupled to the track at or near the first end of the first door panel and wherein the second door panel is coupled to the track at or near the second end of the second door panel.

19. The shroud assembly of claim 18, wherein the shroud assembly has a substantially circular cross-section when the door portion is in the first position.

20. The shroud assembly of claim 18, wherein the shroud assembly has a substantially rectangular cross-section when the door portion is in the first position.

21. The shroud assembly of claim 18, wherein the cover assembly is fixed in position relative to the communication site.

22. The shroud assembly of claim 18, wherein the shroud assembly includes a rotation assembly for allowing circumferential rotation of the cover assembly relative to the communication site.

* * * * *